(12) United States Patent
Tatara et al.

(10) Patent No.: US 10,829,044 B2
(45) Date of Patent: Nov. 10, 2020

(54) VEHICLE MONITORING SYSTEM USING A PLURALITY OF CAMERAS

(71) Applicant: Koito Manufacturing Co., LTD., Tokyo (JP)

(72) Inventors: Naoki Tatara, Shizuoka (JP); Toshihiro Okamura, Shizuoka (JP)

(73) Assignee: Koito Manufacturing Co., LTD. (JP)

( * ) Notice: Subject to any disclaimer, the term of this patent is extended or adjusted under 35 U.S.C. 154(b) by 0 days.

(21) Appl. No.: 16/323,478

(22) PCT Filed: Aug. 4, 2017

(86) PCT No.: PCT/JP2017/028381
§ 371 (c)(1),
(2) Date: Feb. 5, 2019

(87) PCT Pub. No.: WO2018/030285
PCT Pub. Date: Feb. 15, 2018

(65) Prior Publication Data
US 2019/0202355 A1 Jul. 4, 2019

(30) Foreign Application Priority Data

Aug. 8, 2016 (JP) .................................. 2016-155247
Aug. 8, 2016 (JP) .................................. 2016-155257
Aug. 8, 2016 (JP) .................................. 2016-155273

(51) Int. Cl.
*B60R 1/00* (2006.01)
*B60R 1/06* (2006.01)
(Continued)

(52) U.S. Cl.
CPC .................. *B60R 1/00* (2013.01); *B60R 1/06* (2013.01); *B60R 11/04* (2013.01); *B60S 1/56* (2013.01);
(Continued)

(58) Field of Classification Search
None
See application file for complete search history.

(56) References Cited

U.S. PATENT DOCUMENTS

2007/0268118 A1* 11/2007 Watanabe ................ B60R 1/00
340/435
2011/0234801 A1* 9/2011 Yamada ............ H04N 5/23293
348/148
(Continued)

FOREIGN PATENT DOCUMENTS

JP          09323590 A     12/1997
JP          H09323590 A    12/1997
(Continued)

OTHER PUBLICATIONS

International Search Report, International Application No. PCT/JP2017/028381, dated Oct. 24, 2017 (3 pages).
(Continued)

*Primary Examiner* — Fernando Alcon
(74) *Attorney, Agent, or Firm* — Lewis Rice LLC

(57) ABSTRACT

Problem: To provide a vehicle monitoring system capable of checking a wide range of area at the rear of a vehicle to afford a high level of safety, without increasing an amount of protrusion from the side surface of the vehicle body.
Solution: A vehicle monitoring system 1 is provided with a first camera 11 that shoots a first area at the rear side of a vehicle; a second camera 12 that shoots a second area further toward the inside in the width direction of the vehicle compared with the first area; an ECU 13 that combines videos captured by the two cameras; and a monitor 15 that displays the combined image. The first camera 11 is contained in an STSL 3 on a vehicle body side surface, and the second camera 12 is installed in an RCL 4 or a high mounted stop lamp at the rear of the vehicle body. A video processing circuit 14 performs correction to improve the visibility of the
(Continued)

videos of an overlapping section captured by the cameras 11 and 12. The first camera 11 may be equipped with a wide-angle lens having a field of view angle greater than 90°.

5 Claims, 27 Drawing Sheets

(51) Int. Cl.
    *H04N 7/18*     (2006.01)
    *B60R 11/04*     (2006.01)
    *B60S 1/56*     (2006.01)
    *G06K 9/00*     (2006.01)
    *F21V 33/00*     (2006.01)

(52) U.S. Cl.
    CPC .......... *F21V 33/00* (2013.01); *G06K 9/00791* (2013.01); *H04N 7/18* (2013.01); *H04N 7/181* (2013.01); *B60R 2300/105* (2013.01); *B60R 2300/303* (2013.01); *B60R 2300/802* (2013.01)

(56) References Cited

U.S. PATENT DOCUMENTS

| | | | | |
|---|---|---|---|---|
| 2012/0083959 | A1* | 4/2012 | Dolgov | ................... B60T 17/18 701/23 |
| 2012/0257058 | A1* | 10/2012 | Kinoshita | ............. G06T 3/0012 348/148 |
| 2017/0166132 | A1* | 6/2017 | Nemeth | ................... B60R 11/04 |
| 2017/0217369 | A1* | 8/2017 | Endo | ......................... B60R 1/00 |

FOREIGN PATENT DOCUMENTS

| | | | | |
|---|---|---|---|---|
| JP | 2004304522 | A | 10/2004 | |
| JP | 20081772535 | A | 7/2008 | |
| JP | 2009134517 | A | 6/2009 | |
| JP | 2009206747 | A | 9/2009 | |
| JP | 2010260379 | A | 11/2010 | |
| JP | 2011166490 | A | 8/2011 | |
| JP | 2011184030 | A | 9/2011 | |
| JP | 2012056509 | A | 3/2012 | |
| JP | 2013006480 | A | 1/2013 | |
| JP | 2014106635 | A | 6/2014 | |
| JP | 2015223976 | A | 12/2015 | |
| JP | 2015226233 | A | 12/2015 | |
| JP | 2016119558 | A | 6/2016 | |
| WO | 2015193158 | A1 | 12/2015 | |
| WO | WO 2015/193158 | A1 * | 12/2015 | ............. B60R 99/00 |
| WO | 2018030285 | A1 | 2/2018 | |

OTHER PUBLICATIONS

Office Action issued by the China National Intellectual Property Administration in Application No. 201780049399.4 dated Apr. 1, 2020 (23 pages).

* cited by examiner

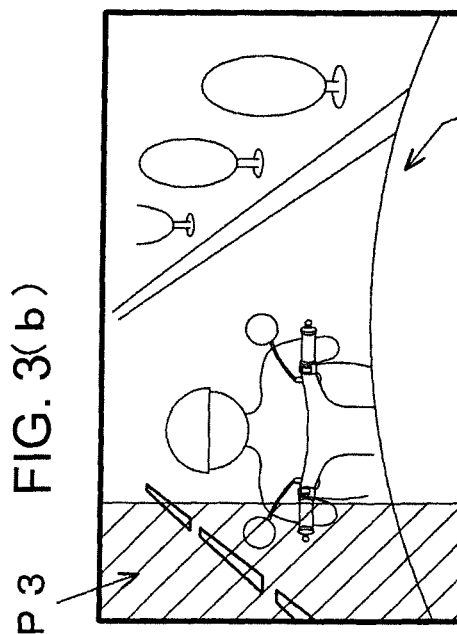
FIG. 3(b) Video of Second Camera
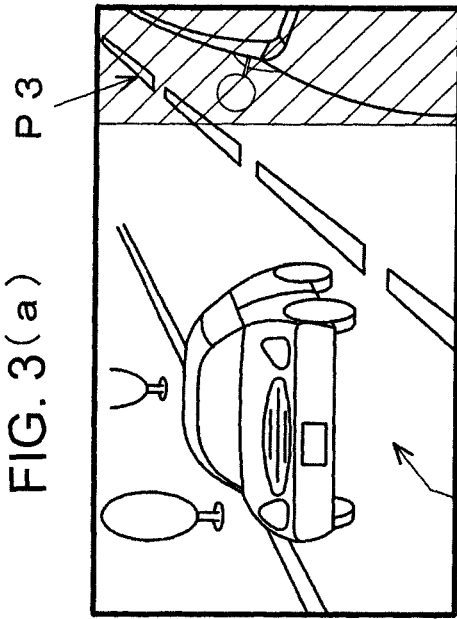
FIG. 3(a) Video of First Camera
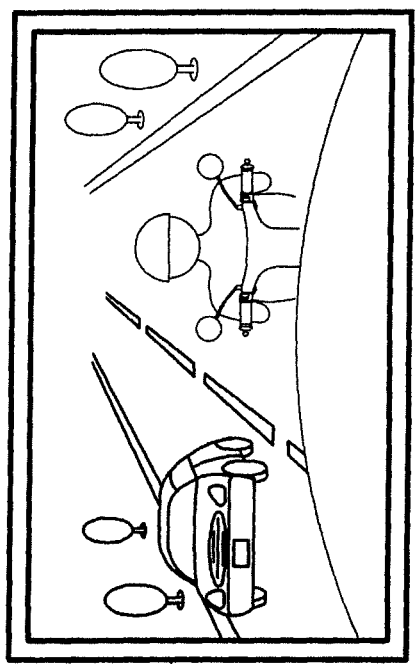
FIG. 3(c) Monitor Video

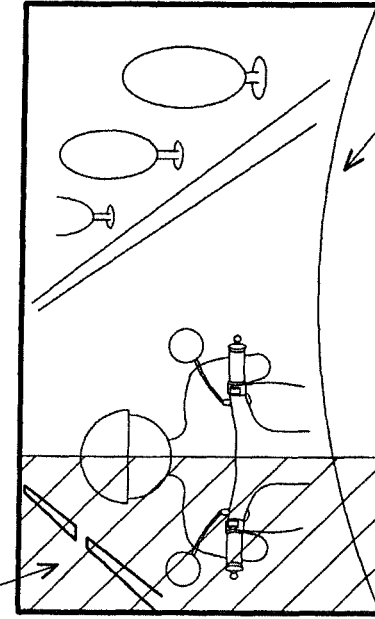
FIG. 13(b) Video of Back Camera
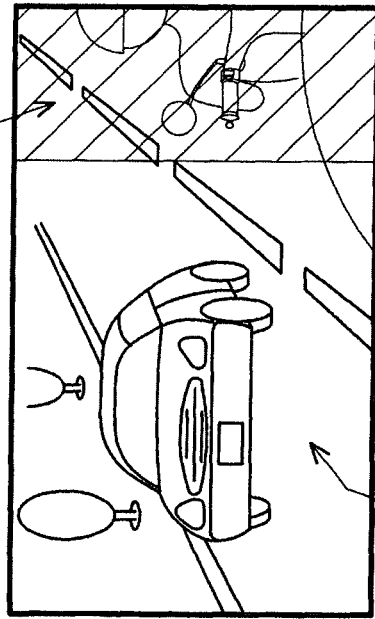
FIG. 13(a) Video of First Camera
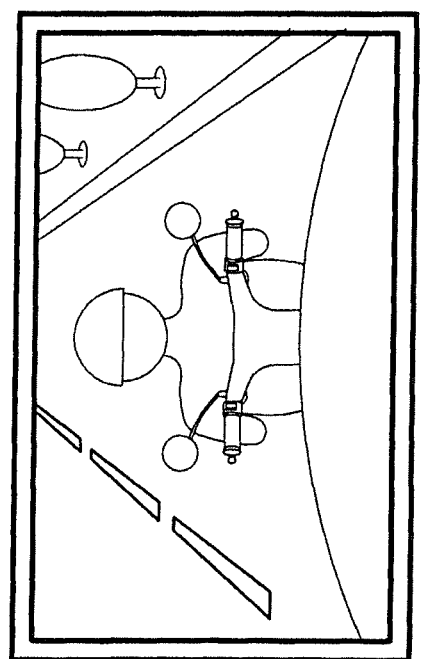
FIG. 13(c) Monitor Video Two ECUs Installed in STSLs Two ECUs Installed outside of Vehicle

VEHICLE MONITORING SYSTEM USING A PLURALITY OF CAMERAS

CROSS REFERENCE TO RELATED APPLICATION(S)

This application is a § 371 U.S. National Phase of International Application Serial No.: PCT/JP2017/028381 filed Aug. 4, 2017, which is turn claims priority to Japanese Patent Application Serial No: 2016-155247, filed Aug. 8, 2016; Japanese Patent Application Serial No: 2016-155257, filed Aug. 8, 2016; and Japanese Patent Application Serial No: 2016-155273, filed Aug. 8, 2016. The entire disclosure of all the above documents is herein incorporated by reference.

TECHNICAL FIELD

The present invention relates to a vehicle monitoring system that gathers scene information about the surroundings of a vehicle with a plurality of cameras or sensors and displays the information on monitors.

BACKGROUND ART

In recent years, technologies have been developed that use a camera monitoring system (CMS) in place of door mirrors. By checking the rear through images shot by the cameras, it is possible to downsize the system, enhance the fuel-efficiency and safety, and reduce the wind noise in comparison to door mirrors. However, if the cameras are mounted on locations similar to door mirrors, the amounts of protrusion from the vehicle body are increased so as to preclude exploitation of the full potential of the use of cameras.

In view of the above, conventionally, a technology has been proposed to contain a camera in the housing of a side-turn signal lamp (STSL). For example, Patent Literature 1 describes "a vehicular periphery imaging device" that has an STSL housing mounted on a side surface of a vehicle body and contains a camera and a reflecting mirror in the housing, the device also being configured to use the camera to directly shoot the rear of the vehicle and indirectly shoot the side of the vehicle via the reflecting mirror.

Moreover, as these cameras are electronic equipment and also connected to multiple electrical components, they have higher failure rates compared to mechanical door mirrors. If a camera fails, a view of the rear side of the vehicle can no longer be obtained, thus reducing the safety. Conventionally, in order to ensure redundancy at the time of failure, technologies have been proposed to mount auxiliary cameras or change the orientation or the shooting area of one of the cameras that are not out of order.

For example, Patent Literature 2 describes a CMS in which multiple cameras are installed so that, when one of the cameras is out of order, a different camera can be pointed to the shooting area of the camera that is out of order so as to continuously monitor the same monitoring area.

CITATION LIST

Patent Literature

Patent Literature 1: Japanese Patent Laid-Open No. 2016-32978
Patent Literature 2: Japanese Patent Laid-Open No. 2007-235655

SUMMARY OF INVENTION

Problem to be Solved by the Invention

As shown in FIG. 27, however, if cameras 53 are contained in STSLs 52 with a small amount of protrusion from a vehicle body 51, the fields of view of the cameras 53 are restricted by the side surfaces of the vehicle body 51 (see FIG. 27a), making it difficult to ensure view equal to door mirrors 54 (see FIG. 27b). Therefore, according to the conventional CMS, there exist safety problems, such as the inward areas at the rear of the vehicle (the areas indicated by ellipses in FIG. 27a) being out of view.

Additionally, if auxiliary cameras are mounted on the vehicle body to ensure redundancy at the time of failure, not only does it make the CMS costly but it also becomes necessary to secure space for the auxiliary cameras on the vehicle body. In addition, to change the orientations or the shooting areas of the cameras that are not out of order, not only does an actuator need to be provided for each camera but also the control becomes complicated, again making the system costly.

Moreover, a conventional CMS normally shoots the right and left sides of a vehicle with separate cameras and processes video data with one electronic control unit (ECU) installed in the vehicle, and thereafter displays it on separate right and left monitors. Due to this, in addition to the time required to transmit video data from the cameras outside of the vehicle to the ECU inside the vehicle, time is also required to process the video data transmitted from the right and left cameras at the single ECU. As the CMS is also used during high-speed driving, the delay time between shooting and monitor display greatly affects the driver's assessment of the situation. Another problem is that if the ECU should fail, the right and left CMSs both stop operating.

A main object of the present invention is to provide a vehicle monitoring system capable of monitoring a plurality of areas around a vehicle using a plurality of vehicle lamps.

Another object of the present invention is to provide a vehicle monitoring system capable of checking a wide range of area at the rear of a vehicle to afford a high level of safety, without increasing an amount of protrusion from the side surface of the vehicle body.

A still other object of the present invention is to provide a vehicle monitoring system capable of ensuring redundancy at the time of failure of a camera with an inexpensive configuration.

A yet other object of the present invention is to provide a vehicle monitoring system capable of separately processing videos shot by right and left cameras to shorten the time from their shooting to monitor display.

Means to Solve the Problem

In order to solve the above-described problem, a vehicle monitoring system according to the present invention is characterized by comprising: a plurality of vehicle lamps for separately illuminating a plurality of areas around a vehicle; a plurality of cameras for separately shooting the plurality of areas around the vehicle; one or more monitors installed in a cabin of the vehicle; and one or more electronic control units that include at least one video processing circuit for displaying videos shot by the cameras on the monitors; wherein the plurality of cameras around the vehicle are each disposed in a vehicle lamp that illuminates substantially the same area as a shooting area of that camera.

Preferably, the one or more electronic control units may be provided in at least one of the plurality of vehicle lamps. The monitors include a left monitor disposed to the left of a driver's seat of the vehicle and a right monitor disposed to the right of the driver's seat. Also, the video processing circuit of the electronic control unit performs processing to cause the left monitor to display videos shot by cameras to the left of the driver's seat and to cause the right monitor to display videos shot by cameras to the right of the driver's seat.

Additionally, the video processing circuit may be configured to perform processing to combine videos of two areas separately shot by two cameras. In this case, the video processing circuit may perform processing to correct videos of overlapping section included in the two areas.

In some embodiments, one or more cleaners are provided for at least one vehicle lamp of the plurality of vehicle lamps for cleaning view of the cameras with fluid, such as water or air, etc.

In a preferred embodiment of the present invention, the vehicle monitoring system is characterized by comprising: a first camera for shooting a first area at a rear side of a vehicle; a second camera for shooting a second area that is more inward in a width direction of the vehicle than the first area; an electronic control unit for combining videos shot by the first and second cameras; and monitors for displaying the combined videos.

While the first camera and the second camera may be directly mounted on the vehicle body, they may also be installed in existing fixtures on the vehicle body, for example, vehicle lamps, as the vehicle body need not be worked on to mount the cameras.

In several embodiments, the first camera is installed in a side turn signal lamps (STSL) disposed on a side surface of the vehicle body. The second camera is installed in a rear lamp at the rear of the vehicle body, such as a rear combination lamps (RCL), a high mount strap lamp (HMSL), a license plate lamp, or rear fog lamp, etc.

Combination of an STSL and an HMSL has high cost performance as the number of cameras per vehicle is reduced (for example, three). In the combination of an STSL and an HMSL, as the fields of view angle of the first and second cameras partially overlap each other, if one of the cameras fail, the video shot by the other camera is used to check the rear so as to ensure redundancy at the time of camera failure.

Additionally, it is also possible to use a back camera as the second camera so that when the first camera fails, the video shot by the back camera may be used to aid the driver in checking the rear. Usually, as back cameras have a downward camera axis, an upper portion of their video is susceptible to a distortion. Therefore, when a back camera is used, it is desirable to correct the distortion and notify the driver that the video of the back camera is used instead while also notifying the driver of the failure.

If the second camera is provided in an RCL or an HMSL, by mounting the second camera on the rear surface of a red lens and performing color correction, both an adequate video free of the influence of red light and an excellent external design can be achieved. In addition, by mounting the second camera on the rear surface of a transparent lens of an RCL or an HMSL, appropriate video can be easily obtained without performing special color correction.

A wide-angle camera may be preferably used as the first camera contained in an STSL, etc. In one embodiment of the present invention, a wide-angle lens with a greater field of view angle that exceeds 90° is provided in the first camera to set wide fields of view on a side of the vehicle (a field of view from the front side to the rear side). Video of the first camera provided with a wide-angle lens may be used in a system different from CMSs, for example, vehicular self-driving systems or safety support systems.

In one embodiment, the electronic control unit includes a video processing circuit for combining the videos of the first camera and the second camera. A preferred video processing circuit is configured to perform correction to improve the visibility of the videos of the overlapping section between the first area shot by the first camera and the first area shot by the second camera.

In a preferred embodiment of the present invention, a vehicle monitoring system is characterized by comprising: a first sensor for collecting scene information about a first area around a vehicle; monitor means for displaying the scene information collected by the first sensor; a second sensor for collecting scene information about a second area around the vehicle; and an electronic control unit for performing video processing to provide at least part of the scene information about the second area to the monitor means when the first sensor fails.

In some embodiments, the second area includes a section overlapping the first area, and when the first sensor fails, the electronic control unit performs video processing to retrieve scene information that includes the overlapping section from the scene information about the second area collected by the second sensor and to provide that to the monitor means.

For example, a camera can be used as each of the first sensor and the second sensor. In particular, the first sensor includes a first camera for shooting the first area at a rear side of the vehicle, and the second sensor includes a second camera for shooting the second area at a rear of the vehicle. Also, when the first camera fails, the electronic control unit is configured to perform video processing to retrieve video data of the section overlapping the first area from the video data collected by the second camera and to provide that to the monitor means.

Note that the video data generated by the video processing may not necessarily correspond to the actual scene information. Therefore, it is desirable to provide a means to let the occupant know that video processing has been performed on the data. Specifically, a failure detector that detects failure of the first sensor and an annunciator that informs the occupant of the vehicle of that failure may be provided.

The monitor means may include a monitor for displaying the video data shot by the first camera to the occupant. In one embodiment, the electronic control unit may provide the scene information collected by the first camera to a vehicular self-driving system of the vehicle In another embodiment, a laser scanner or a stereo camera for collecting scene information that includes distances to objects present in the second area may also be used as the second sensor. Based on the scenery information that includes distances, the electronic control unit can cause the monitor to display a distance image of the objects that are present in the overlapping section between the first area and the second area.

In a preferred embodiment of the present invention, a vehicle monitoring system is characterized by comprising: a right CMS for shooting an area to the right of a vehicle with a camera and processing a video shot by the camera at an ECU to display the video on a monitor; and a left CMS for shooting an area to the left of the vehicle with a camera and processing a video shot by the camera at an ECU to display the video on a monitor, and wherein the ECUs of the right and left CMSs independently process the videos shot by the cameras.

In one embodiment of the present invention, the cameras and the ECUs of the right and left camera monitoring systems are installed in vehicle lamps To allow for monitoring the rear of the vehicle in a wide range, the cameras of the right and left CMSs include a first camera for shooting a first area at a rear side of the vehicle, and a second camera for shooting a second area that is more inward in a width direction of the vehicle than the first camera.

Preferably, the first camera may be installed in an STSL and the second camera may be installed in a rear lamp. Exemplary rear lamps may be lamps installed at the rear of the vehicle body, such as rear combination lamps (RCLs), high mount strap lamps (HMSLs), license plate lamps, and rear fog lamps, etc. The right and left CMSs may be each provided with two ECUs for separately processing the video shot by the first camera and the video shot by the second camera.

In this case, the two ECUs may be installed in the housings of separate vehicle lamps together with the first camera and the second camera. Moreover, cleaners may be provided for the vehicle lamps for cleaning view of the cameras with fluid so as to be able to obtain clear videos from the cameras.

Effects of the Invention

According to the vehicle monitoring systems of the present invention, the following effects can be obtained:

(1) A plurality of areas around the vehicle can be monitored using a plurality of vehicle lamps.

(2) As an area that is more inward in the width direction of the vehicle than the first camera is shot by the second camera, a field of view equivalent to or wider than door mirrors can be secured without causing the first camera to protrude significantly from the side surface of the vehicle.

(3) It is possible to ensure redundancy at the time of failure with an inexpensive configuration as at least part of the scene information collected by the second sensor is provided to the monitor means when the first sensor fails.

(4) The time from shooting to monitor display can be shortened as separate ECUs are provided in the right and left CMSs and the ECUs separately process videos of the right and left cameras and provide them to the monitors.

BRIEF DESCRIPTION OF THE DRAWINGS

FIG. 3 is a view of a monitor screen that illustrates video processing by the ECU in the first embodiment.

FIG. 13 is a view of a monitor screen that illustrates video processing by the ECU in the sixth embodiment.

DESCRIPTION OF EMBODIMENTS

The present invention will be described in detail hereinafter with reference to several embodiments. In each of the views, identical symbols designate identical components.

Embodiment 1

Figure 1:
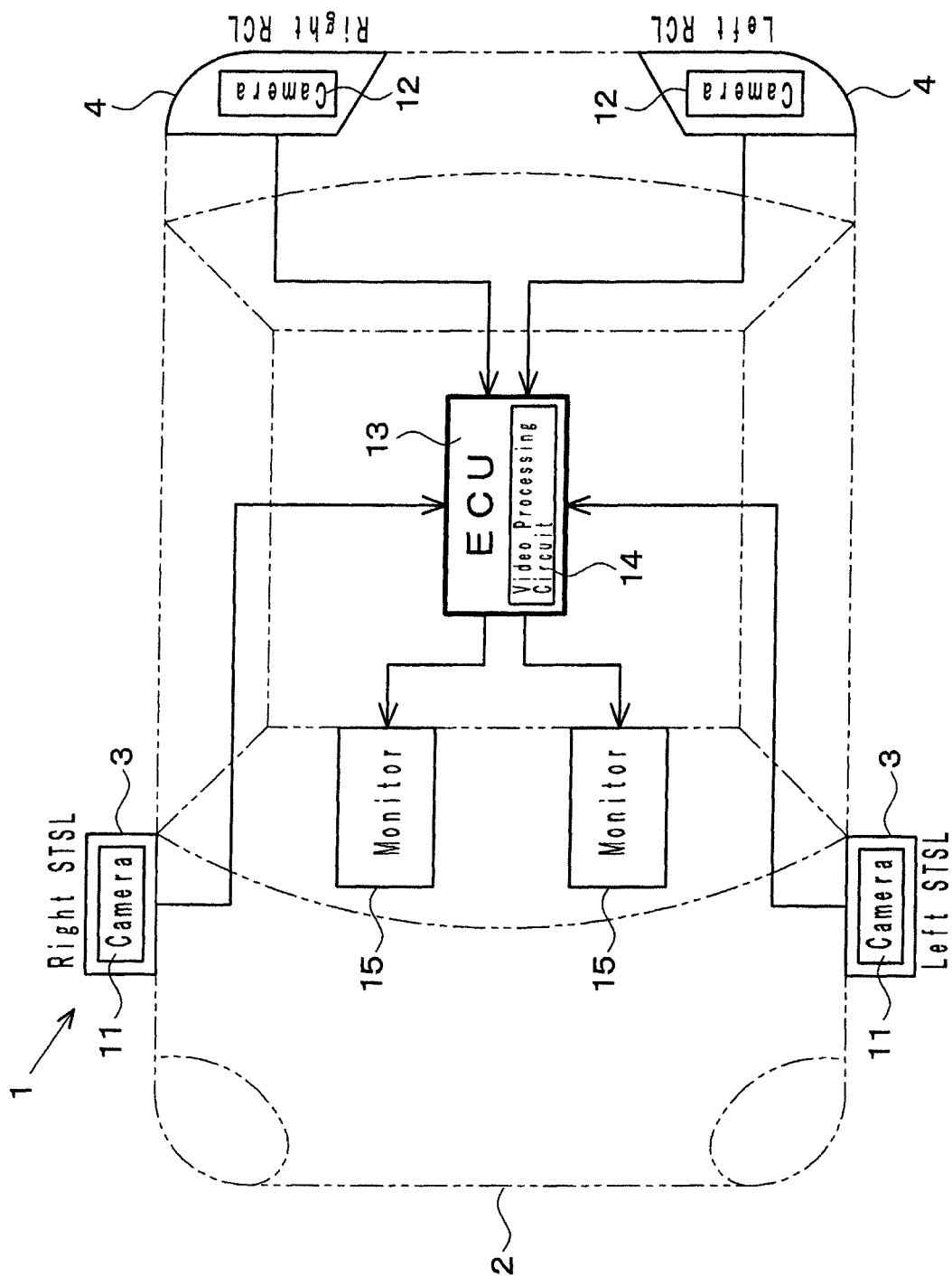
FIG. 1 is a block diagram showing a first embodiment of a vehicle monitoring system according to the present invention.
Figure 2:
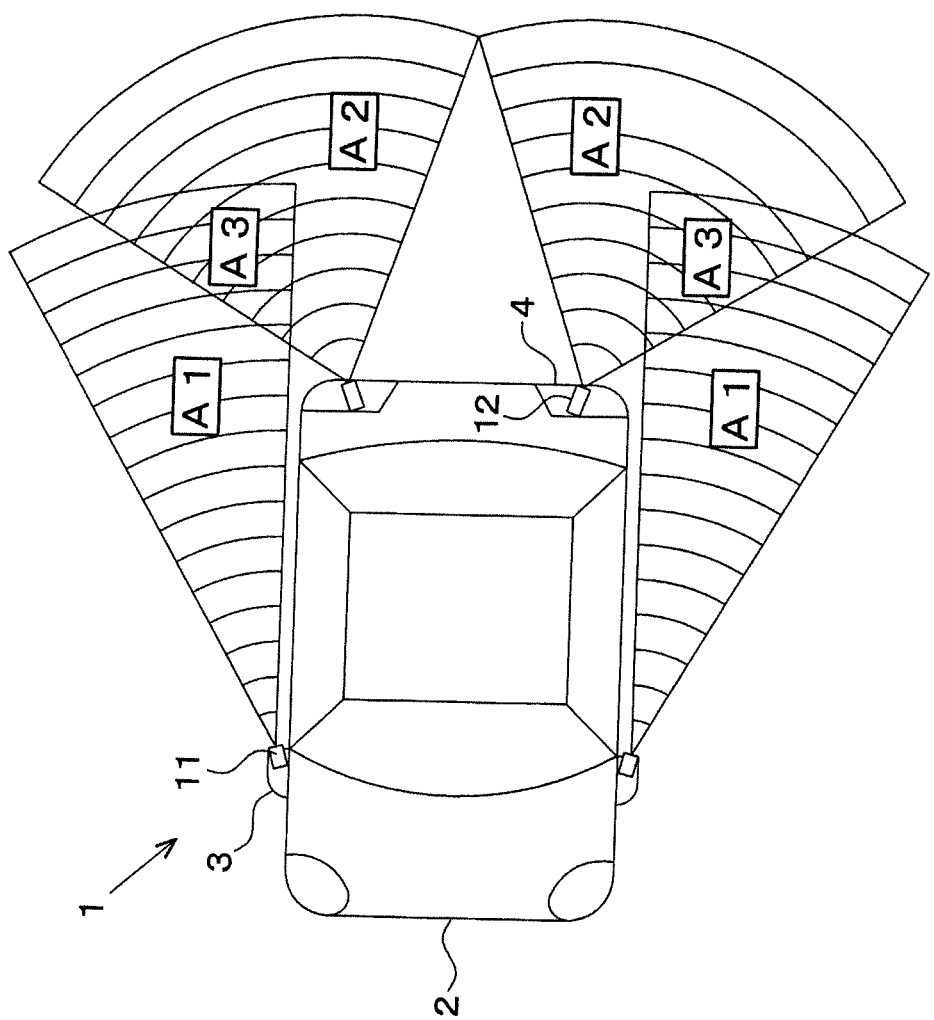
FIG. 2 is a plan view of a vehicle that shows the fields of view of the cameras in the first embodiment.

In a vehicle monitoring system 1 of the first embodiment shown in FIGS. 1 and 2, first cameras 11 are contained in right and left STSLs 3, and second cameras 12 are contained in right and left RCLs 4. The STSLs 3 are provided on both right and left side surfaces of a vehicle body 2, and the first cameras 11 shoot first areas A1 at the rear sides of the vehicle. The RCLs 4 are provided on the rear surface of the vehicle body 2, and the second cameras 12 shoot second areas that are more inward in the width direction of the vehicle than the first areas A1.

The videos shot by the first cameras 11 and the second cameras 12 are transmitted from these cameras 11 and 12 to an electronic control unit (ECU) 13. The ECU 13 is installed in an appropriate location in the vehicle and includes a video processing circuit 14 to combine the videos from the cameras 11 and 12. Also, a pair of monitors 15 is installed to the right and left of the driver's seat to display the videos combined by the ECU 13 to the driver.

FIG. 3 shows video processing performed by the ECU 13. FIG. 3(a) shows a video P1 of the first area A1 shot by a first camera 11, and FIG. 3(b) shows a video P2 of the second area A2 shot by a second camera 12. The videos P1 and P2 include videos P3 (indicated by hatching) of a section A3 (see FIG. 2) where the two areas A1 and A2 overlap each other. When combining the videos P1 and P2, a video processing circuit 14 of the ECU 13 performs correction to coordinate the different videos P3, which represent the overlapping section A3, and displays on the monitor 15 a video that is easy for the driver to see as shown in FIG. 3(c).

Therefore, according to the vehicle monitoring system 1 of the first embodiment, an inward area of the rear of the vehicle that cannot be shot by the first camera 11 (the rear of the own vehicle in FIG. 3a) can be shot by the second camera 12, and a wide range video that includes that video can be displayed on the monitor 15. Therefore, the first camera 11 can be contained in the STSL 3 to take full advantage of the merits of using a camera by reducing the amount of protrusion from the side surface of the vehicle body. As the second camera 12 is contained in an RCL 4, which has a relatively large volume, it can easily ensure a wider view at the rear of the vehicle than a door mirror.

Figure 4:
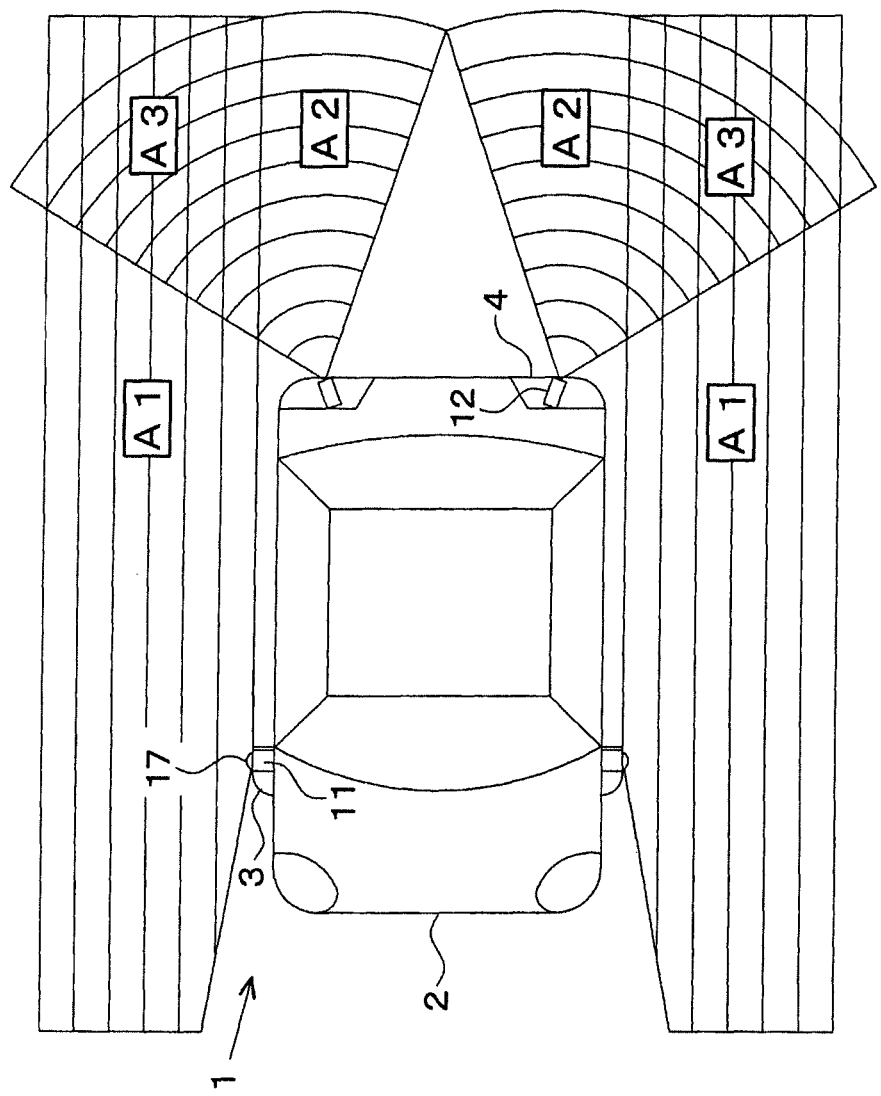
FIG. 4 is a plan view that shows the fields of view of first cameras with a wide-angle lens in the first embodiment.

In the vehicle monitoring system 1 shown in FIG. 4, first cameras 11 contained in STSLs 3 are equipped with wide-angle lenses 17 having a field of view angle of 90°-180°. The first cameras 11, which are equipped with the wide-angle lenses 17, are capable of expanding forward the first areas A1 that are at the rear sides of the vehicle so as to provide a wide field of view in the front and rear directions.

Embodiment 2

Figure 5:
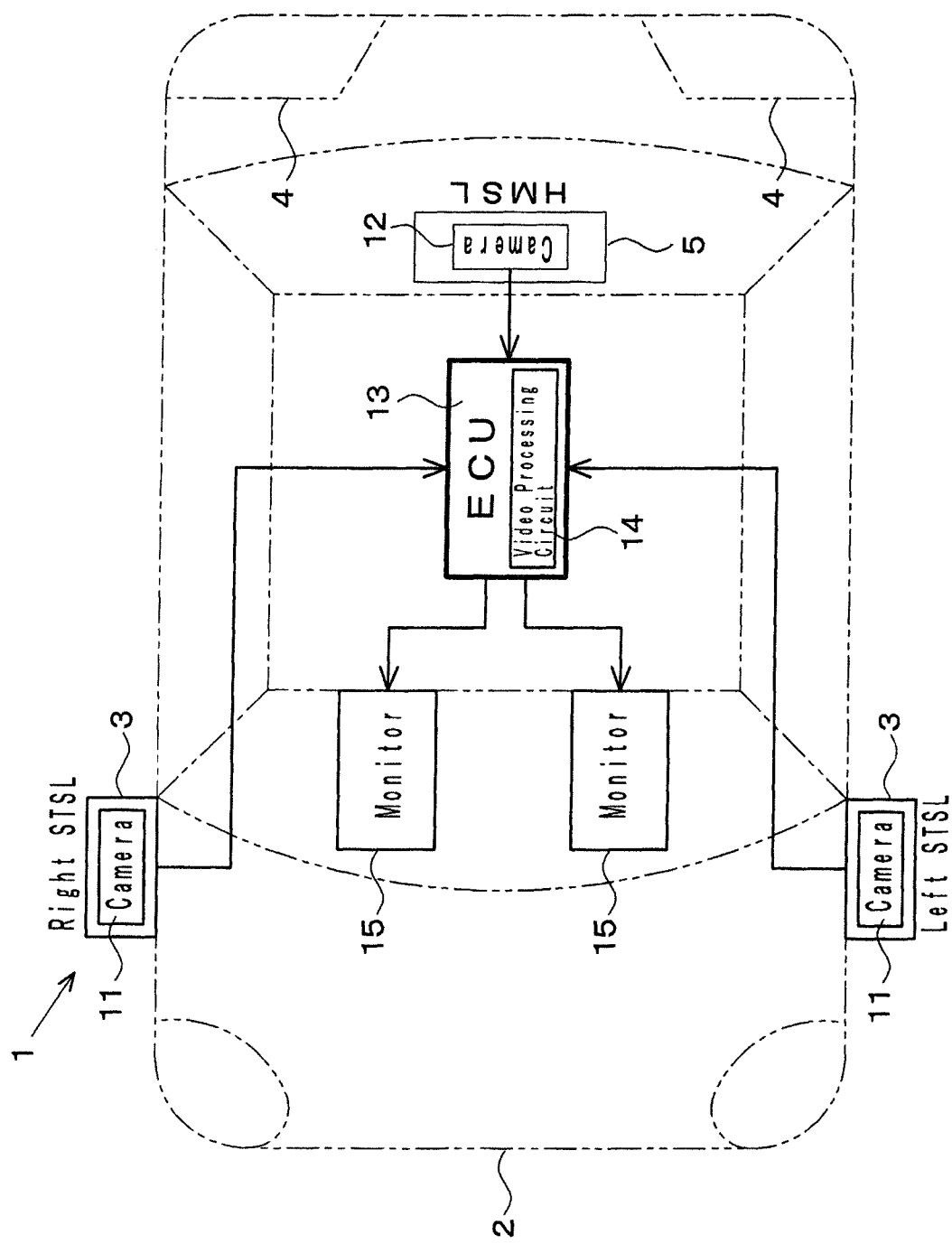
FIG. 5 is a block diagram showing a second embodiment of a vehicle monitoring system according to the present invention.
Figure 6:
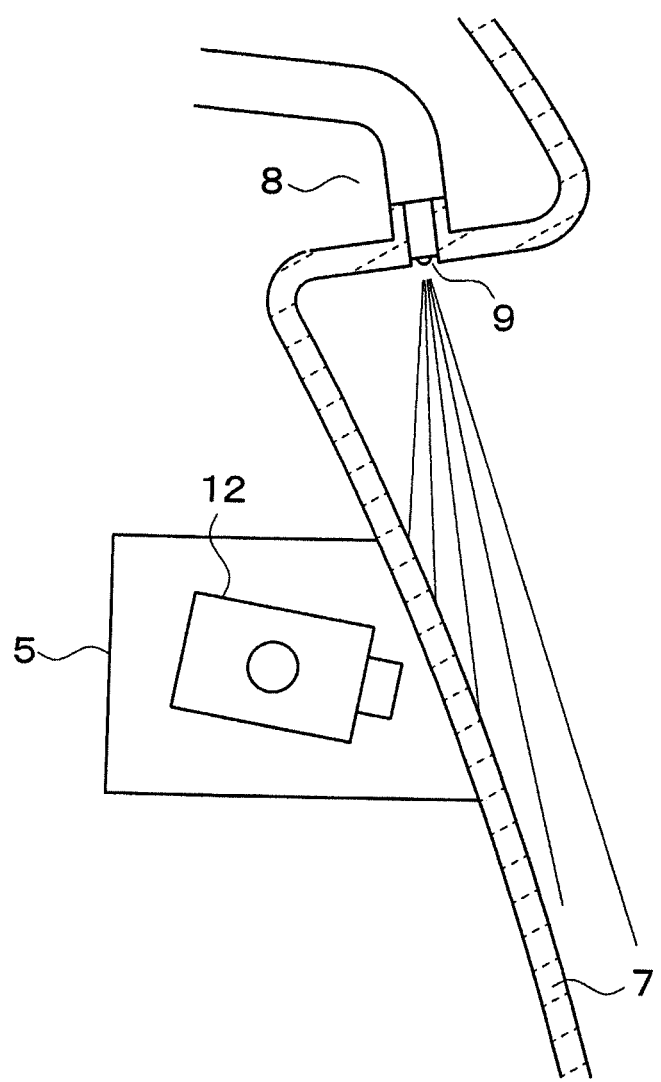
FIG. 6 is an elevation view of a window cleaner adjacent to a second camera in the second embodiment.
Figure 7:
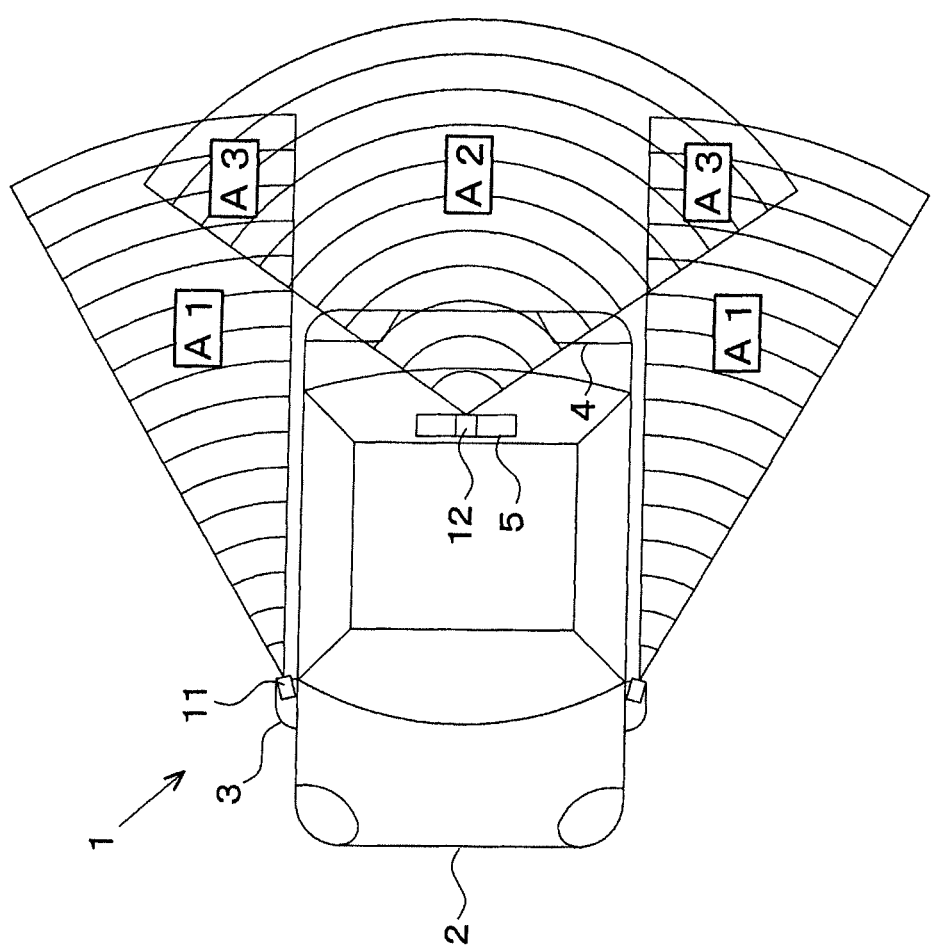
FIG. 7 is a plan view of a vehicle that shows the fields of view of the first and second cameras in the second embodiment.

In a vehicle monitoring system 1 of a second embodiment shown in FIGS. 5, 6, and 7, first cameras 11 are contained in right and left STSLs 3, and a second camera 12 is contained in an HMSL 5. The HMSL 5 shown in FIG. 6 is installed on the cabin side of the rear window 7 at an elevated location in the vehicle body, and the second camera 12 shoots the rear of the vehicle through the rear window 7. A window cleaner 8 is installed above the HMSL 5 to clean the rear window 7 as well as the view of the second camera 12 using cleaning fluid squirted from a cleaner nozzle 9. Therefore, the second embodiment has the advantages of being able to clearly shoot a wide range of area behind the vehicle (see FIG. 7) with the single second camera 12 installed in the HMSL 5 and of being able to inexpensively configure the entire monitoring system 1 using three cameras.

Embodiment 3

Figure 8:
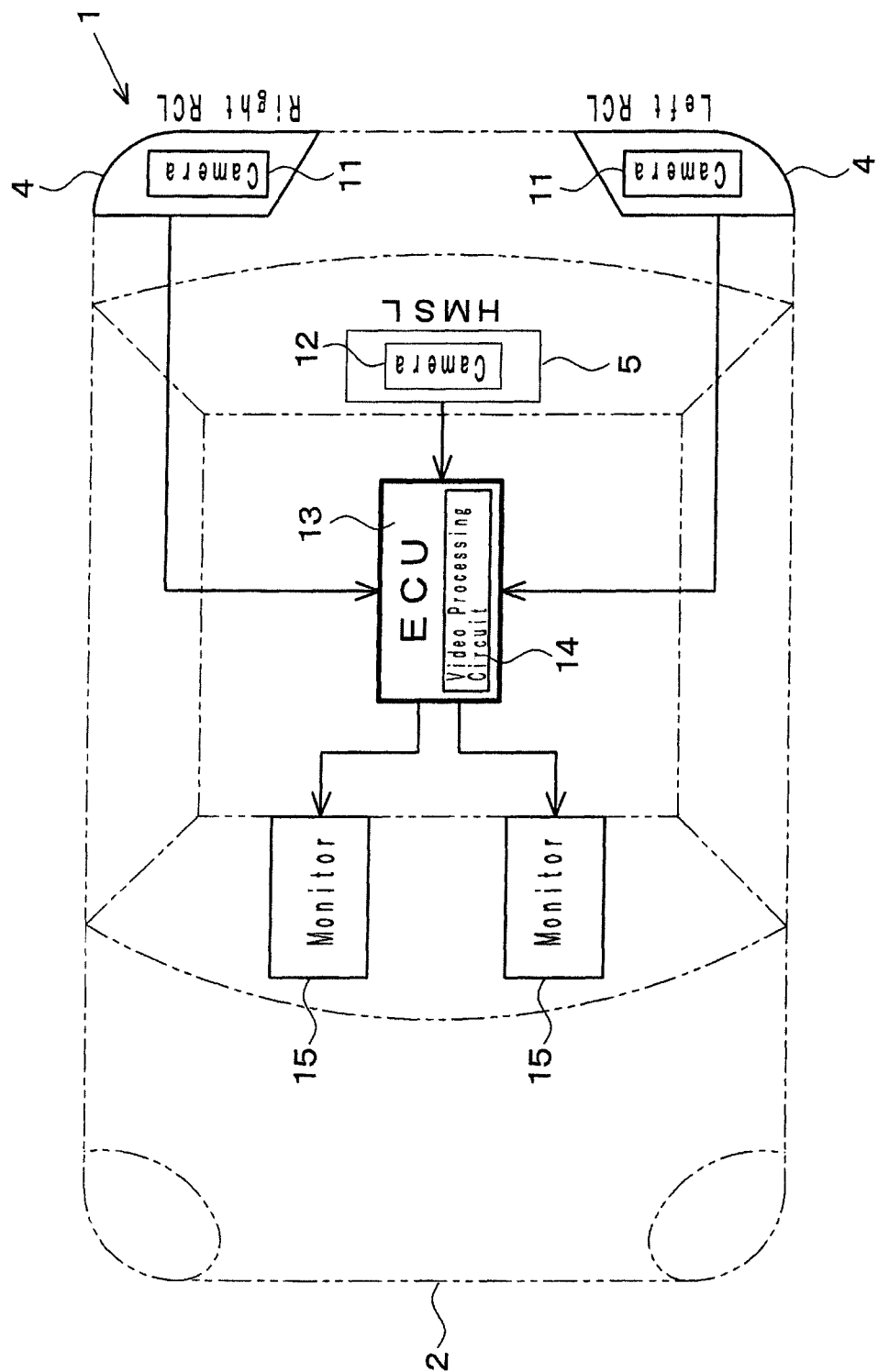
FIG. 8 is a block diagram showing a third embodiment of a vehicle monitoring system according to the present invention.

In a vehicle monitoring system 1 of a third embodiment shown in FIG. 8, first cameras 11 are contained in right and left RCLs 4, and a second camera 12 is contained in an HMSL 5. Additionally, the first cameras 11, which are located more outward in the width direction of the vehicle than the second camera 12, are adapted to shoot the first areas (the areas indicated by A1 in FIG. 2) at the rear sides of the vehicle, and the second camera 12, which is located more inward in the width direction of the vehicle than the first cameras 11, is adapted to shoot the second area (the area indicated by A2 in FIG. 7) at the rear of the vehicle. According to the third embodiment, as the first cameras 11 are contained in the RCLs 4, it is possible to eliminate protrusions from the side surfaces of the vehicle.

Embodiment 4

Figure 9:
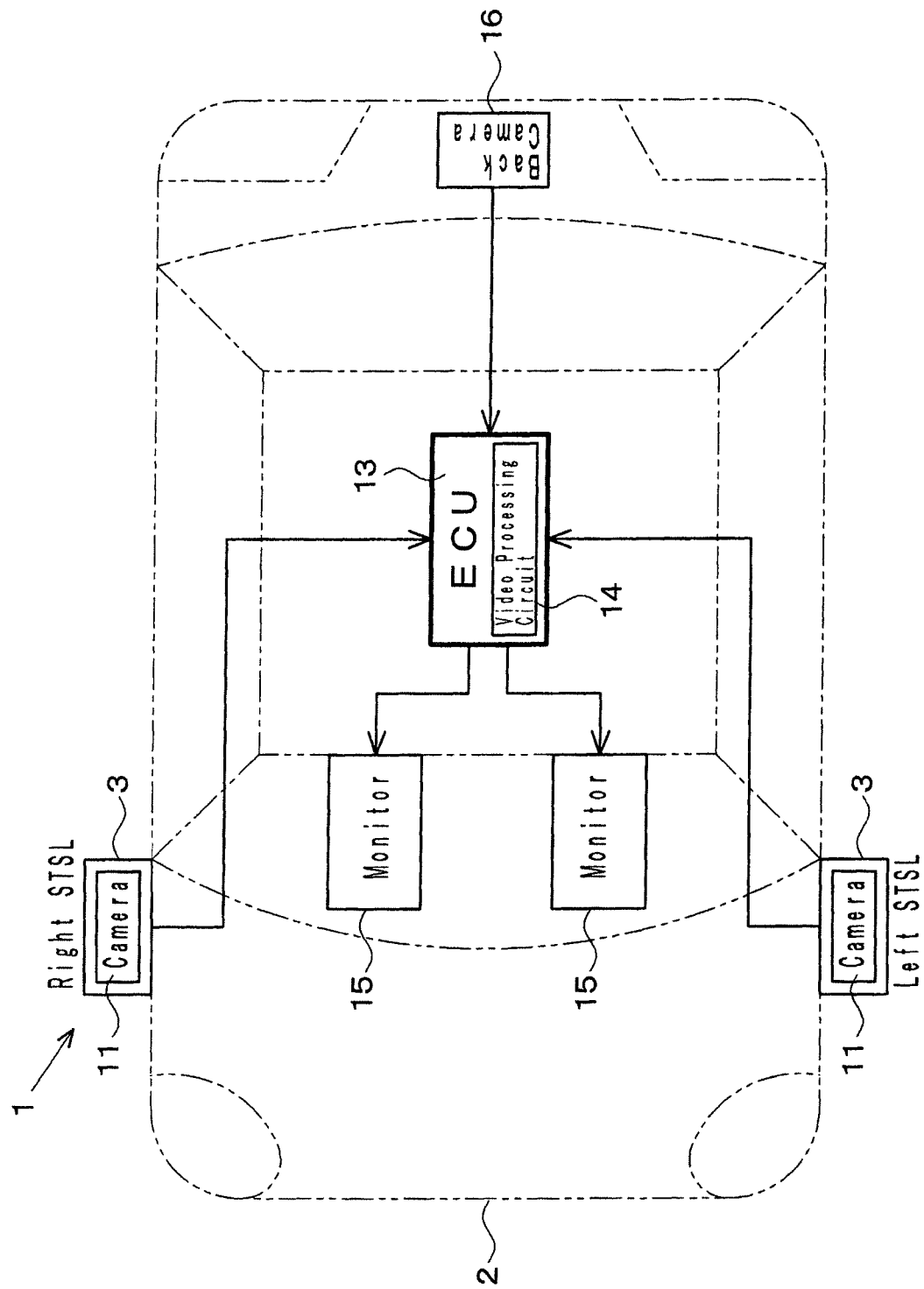
FIG. 9 is a block diagram showing a fourth embodiment of a vehicle monitoring system according to the present invention.

In a vehicle monitoring system 1 of a fourth embodiment shown in FIG. 9, first cameras 11 are contained in right and left STSLs 3, and a back camera 16 is used as a second camera. Normally, the back camera 16 starts shooting when the vehicle backs up; however, according to the monitoring system 1 of this embodiment, the back camera 16 shoots the rear of the vehicle in synchronization with the first cameras 11 when the vehicle travels forward, and the video is displayed together with the videos of the first cameras 11 on monitors 15 that are different from a back view monitor (not shown).

Embodiment 5

Figure 10:
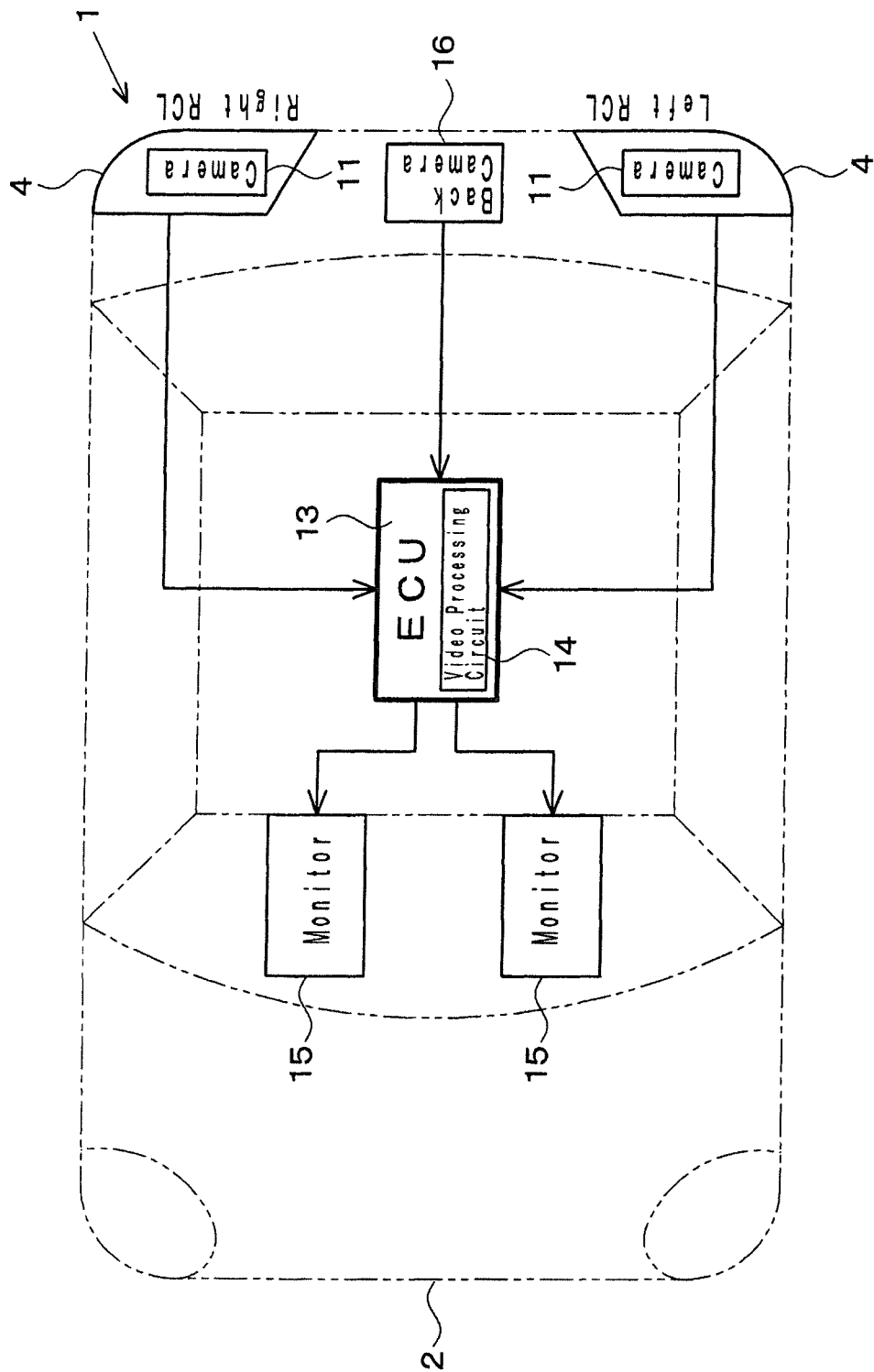
FIG. 10 is a block diagram showing a fifth embodiment of a vehicle monitoring system according to the present invention.

In a vehicle monitoring system 1 of a fifth embodiment shown in FIG. 10, first cameras 11 are contained in right and left RCLs 4, and a back camera 16 is used as a second camera so that the first cameras 11 shoot the rear sides of the vehicle and the back camera 16 shoots the rear of the vehicle. Therefore, all the cameras 11 and 16 are arranged inward in the width direction of the vehicle so that protrusions can be eliminated from the side surfaces of the vehicle body.

Embodiment 6

A vehicle monitoring system 1 of a sixth embodiment shown in FIGS. 11-14 is configured to ensure redundancy at the time of camera failure. In this case, first cameras 11 are contained in right and left STSLs 3 and used as first sensors to collect scene information about first areas A1 at the rear sides of the vehicle (see FIG. 12). A back camera 16 or a second camera is used as a second sensor that collects scene information about a second area A2 at the rear of the vehicle that includes sections A3 that overlap the first areas A1. Right and left monitors 15 function as monitor means to allow the occupant to monitor the scene information collected by the first sensors 10.

Additionally, the vehicle monitoring system 1 is provided with a failure detector 20 that detects a failure of a first camera 11, an annunciator 21 that informs the occupant of the vehicle of that failure via a lamp, a buzzer, a sound, etc., a communication system 22 that communicates with road facilities and other vehicles, and a self-driving system 23 of the vehicle, etc. When a first camera 11 fails, the ECU 13 processes the video data of the second area A2 shot by the back camera 16 and causes the monitor 15 to display part of that video data in a failure mode. For example, as shown in FIG. 13, the ECU retrieves the video data that includes the overlapping section A3 between the first area A1 and the second area A2, from the video data of the second area A2 and provides that data to the monitor 15.

In FIG. 13, (a) shows a video P1 of the first area shot by a first camera 11 before failure, and (b) shows a video P2 of the second area shot by the back camera 16. These videos P1 and P2 include videos P3 of the overlapping section (indicated by hatching). In this case, if the first camera 11 fails, the video P3 included in the overlapping section A3 (a video of a two-wheeled vehicle) is retrieved from the video P2 and is displayed together with a video of the surroundings on the monitor 15 in an easy-to-see manner as shown in (c). Therefore, simple video processing can ensure redundancy of the monitoring system 1 at the time of camera failure.

In the foregoing sixth embodiment, a distance sensor 24 (see FIG. 11), such as a laser scanner, a stereo camera, etc., can be used as the second sensor in place of the back camera 16. The distance sensor 24 is preferably installed in an elevated location, for example, in an HMSL 5 (see FIG. 7), in the vehicle body as highly accurate distance data can be obtained. Then, the distance sensor 24 continuously collects data about the distances to objects present in the second area A2 and provides it to the ECU 13. If a first camera 11 fails, the ECU 13 generates a distance image of objects that are present in the overlapping section based on the distance data and causes the monitor 15 to display the image.

Figure 14:
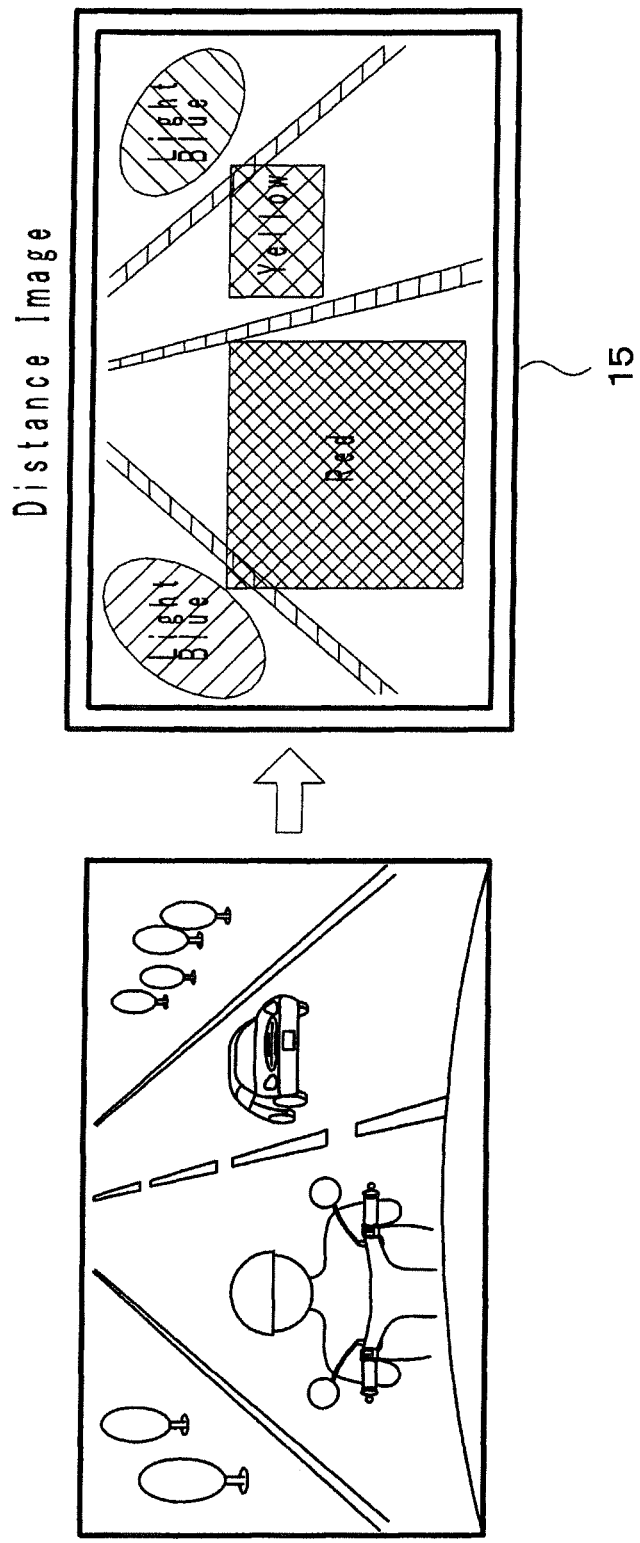
FIG. 14 is a view of a monitor screen that shows a distance image in the sixth embodiment.

As illustrated in FIG. 14, a distance image can quickly provide the driver with scene information useful to make emergency decisions at the time of camera failure as the image schematically shows objects in outline and represents the distances from the vehicle body to the objects in different colors. It should be noted that, when a first camera 11 fails, it is preferable to inform, via the annunciator 21, the occupant of danger on the side of the failure, such as the approach of another vehicle, according to vehicle information 25 (see FIG. 11) obtained from the own vehicle or another vehicle, or from infrastructure information obtained from road-to-vehicle communication.

Embodiment 7

A seventh embodiment of the present invention will be described hereinafter. A vehicle monitoring system 1 of the seventh embodiment is configured to separately control CMCs disposed on both right and left sides of the vehicle body with separate ECUs. First, a general procedure to process video data will be described before describing the seventh embodiment. In a vehicle monitoring system 1 shown in FIGS. 15 and 16, a single ECU 13 processes video data of a total of four cameras A-D (right and left first cameras 11 and right and left second cameras 12).

Figure 15:
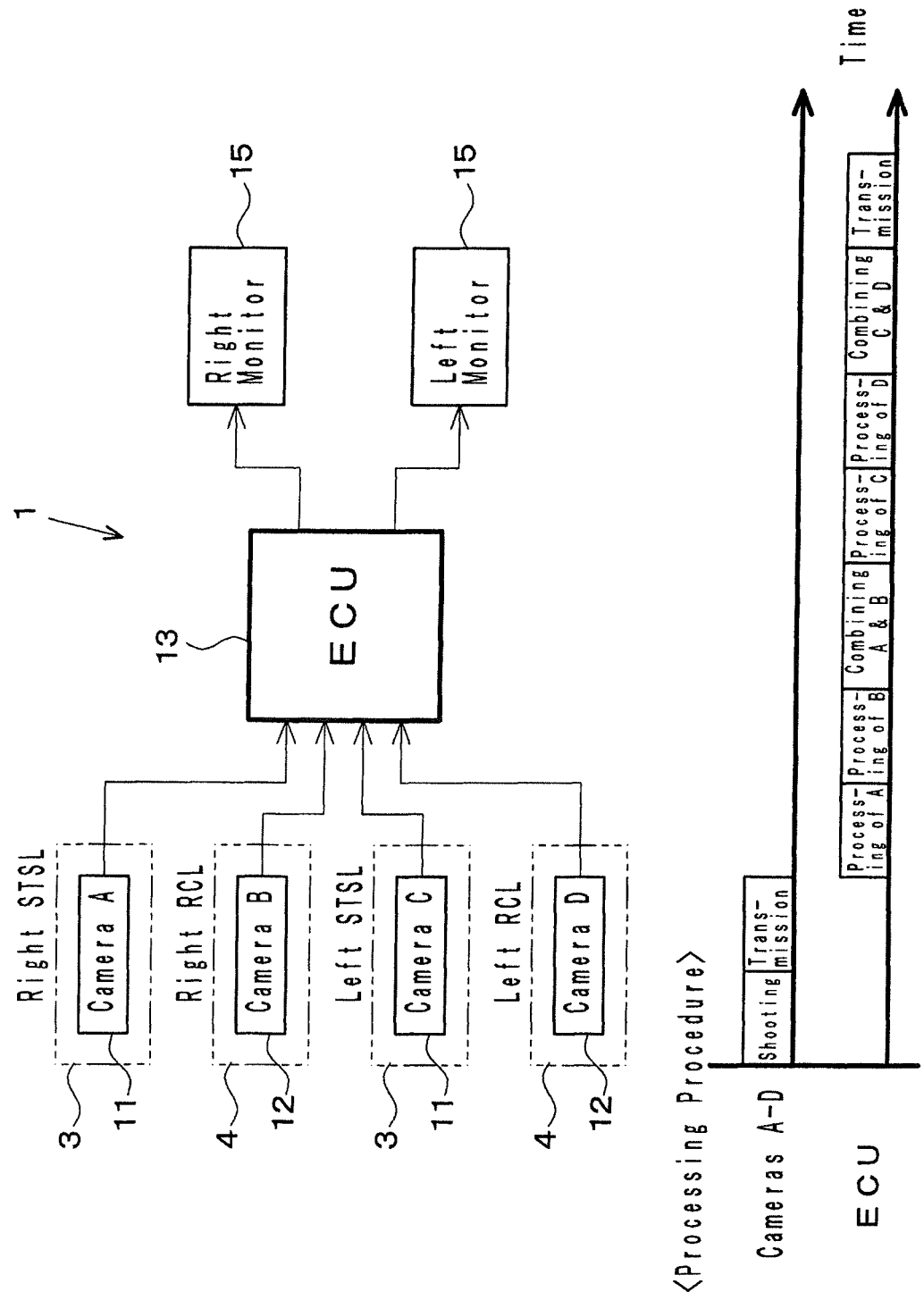
FIG. 15 is a block diagram that shows a procedure to process video data shot by cameras.
Figure 16:
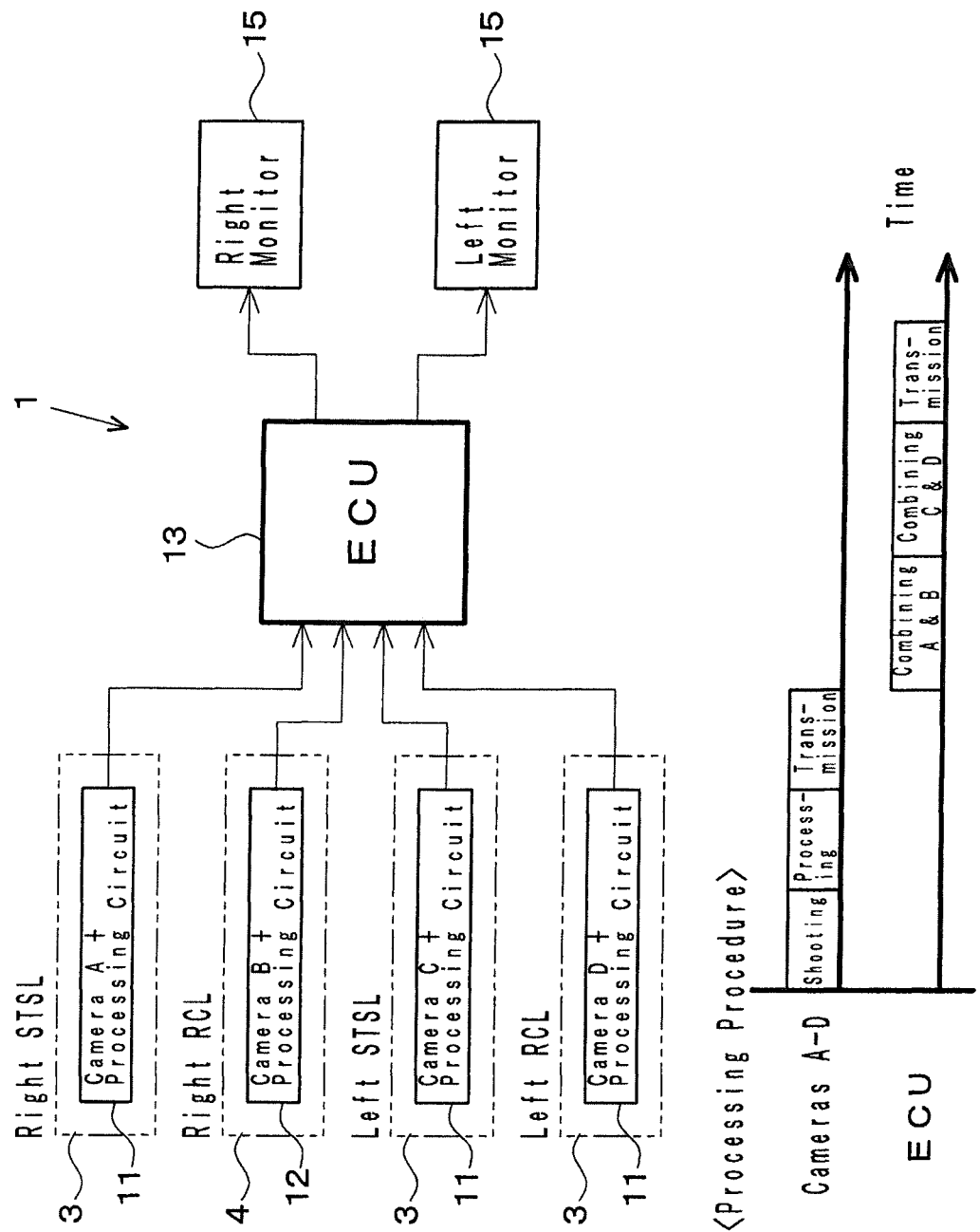
FIG. 16 is a block diagram that shows another procedure to process video data.

That is, in the system shown in FIG. 15, the cameras A-D shoot the scene around the vehicle and send the video data to the ECU 13, whereupon the ECU 13 processes and combines video data A and B of the right side of the vehicle, and then processes video data C and D of the left side of the vehicle and combines the video data C and D, subsequently transmitting the data to monitors 15. In the system shown in FIG. 16, the cameras A-D are provided with a processing circuit, perform shooting, process and send video data to the ECU 13, whereupon the ECU 13 combines the video data A and B of the right side, and then combines the video data C and D of the left side of the vehicle, subsequently transmitting the data to monitors 15. Accordingly, the systems of FIGS. 15 and 16 take a considerable time from shooting by the cameras to monitor display.

Figure 17:
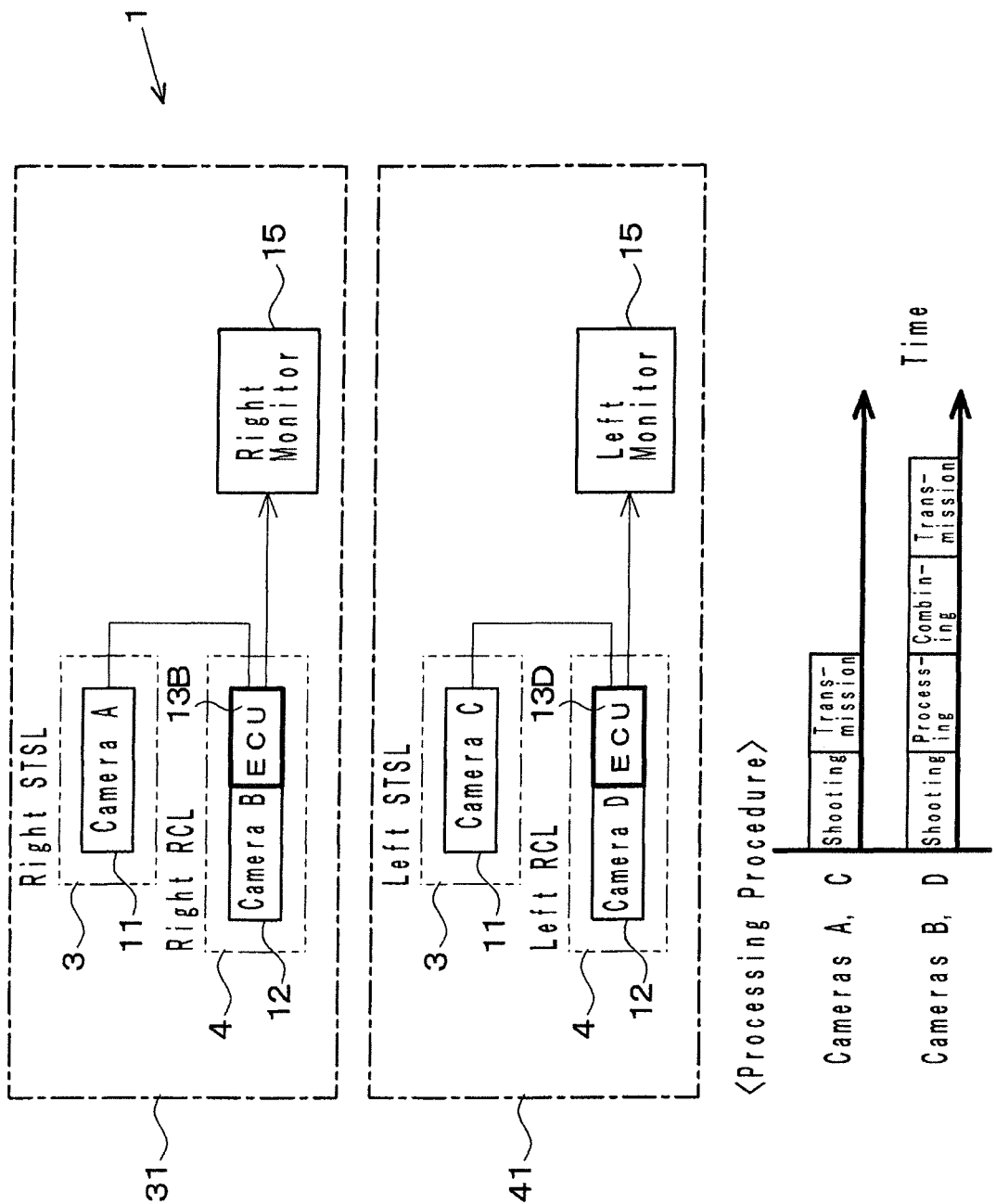
FIG. 17 is a block diagram showing a seventh embodiment of a vehicle monitoring system according to the present invention.

In contrast, the vehicle monitoring system 1 of the seventh embodiment shown in FIG. 17 includes independent CMSs 31 and 41 on both the right and left sides. That is, the right CMS 31 is comprised of a camera A (a first camera 11) for shooting the right rear side, a camera B (a second camera 12) that is more inward in the width direction of the vehicle than the camera A for shooting the right rear, an ECU 13B for processing video data of the cameras A and B, and a right monitor 15 for displaying the processed video data. Similarly, the left CMS 41 is comprised of a camera C (a first camera 11), a camera D (a second camera 12), an ECU 13D, and a left monitor 15.

The arrangement of the cameras is identical to the first embodiment (see FIGS. 1 and 2) with the cameras A and C contained in the housings of the right and left STSLs 3 and the cameras B and D and ECUs 13B and 13D contained in the housings of the right and left RCLs 4. Initially, the cameras A-D perform shooting, and while the cameras A and C are transmitting the video data to the ECUs 13B and 13D, the ECUs 13B and 13D process the video data of the cameras B and D and, subsequently, the ECUs 13B and 13D combine video data A-D and then transmit the data to the monitors 15. In this way, as the right and left CMSs 31 and 41 are provided with the respective ECUs 13B and 13D, advantageously, the data of the cameras B and D can be processed while the data of the cameras A and C is transmitted, and the delay time from shooting to monitor display can be shortened, and even if one of the CMSs stops operating due to failure of the ECU, the other CMS can continue its operation.

Embodiment 8

Figure 18:
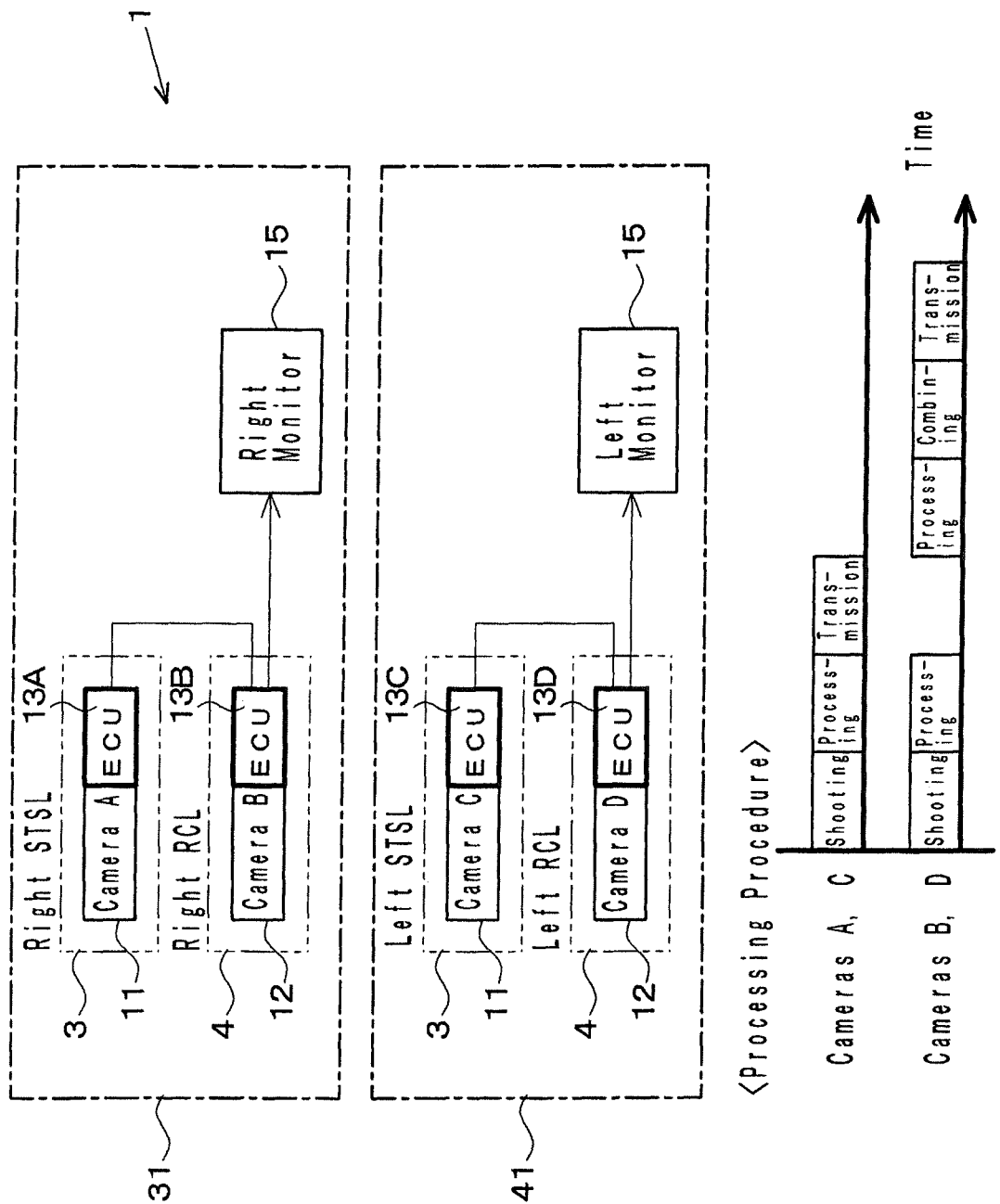
FIG. 18 is a block diagram showing an eighth embodiment of a vehicle monitoring system according to the present invention.
Figure 19:
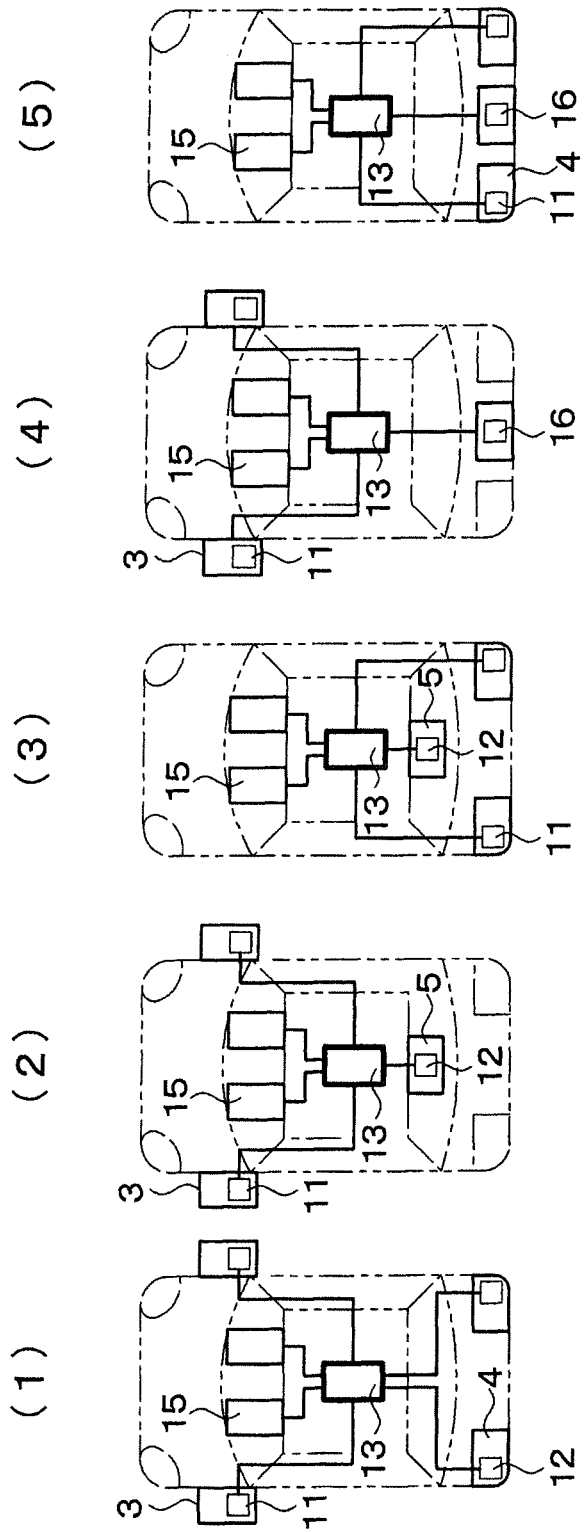
FIG. 19 is a block diagram showing first exemplary arrangements of cameras and ECUs.
Figure 20:
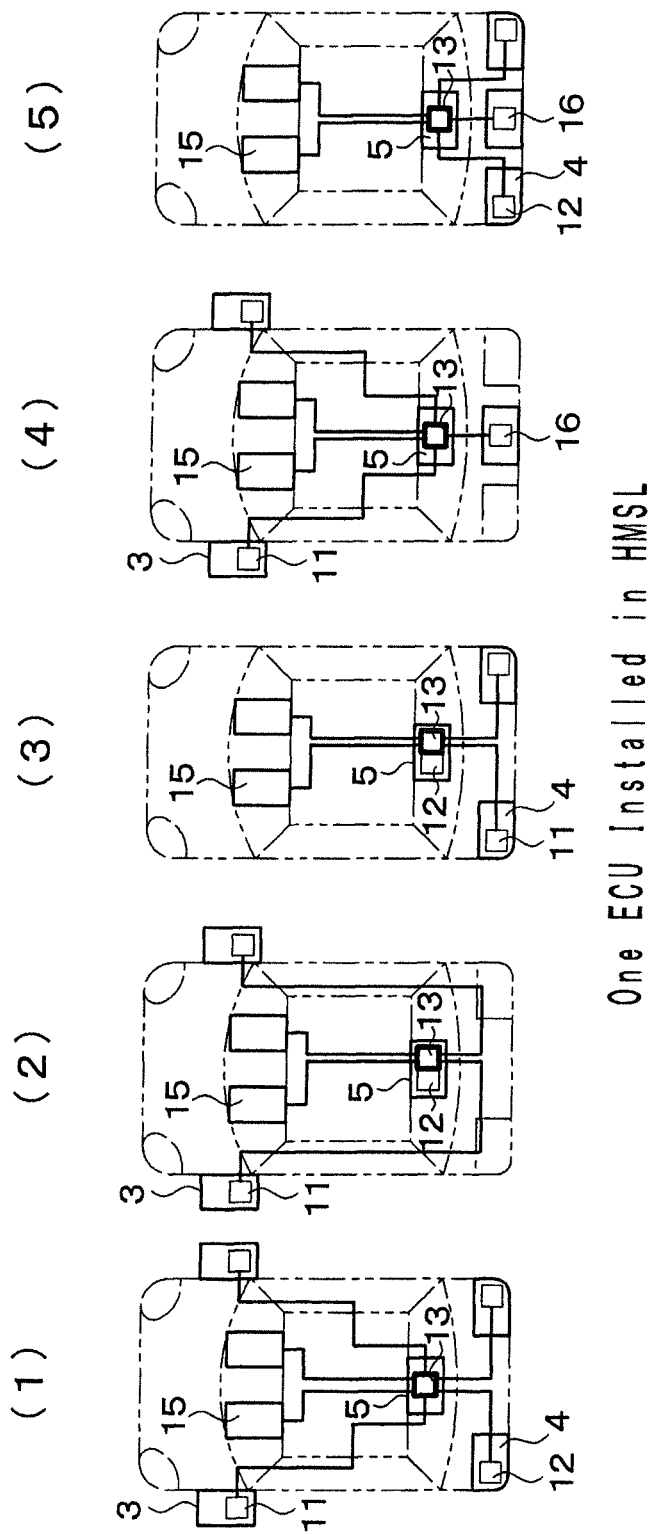
FIG. 20 is a block diagram showing second exemplary arrangements of cameras and ECUs.
Figure 21:
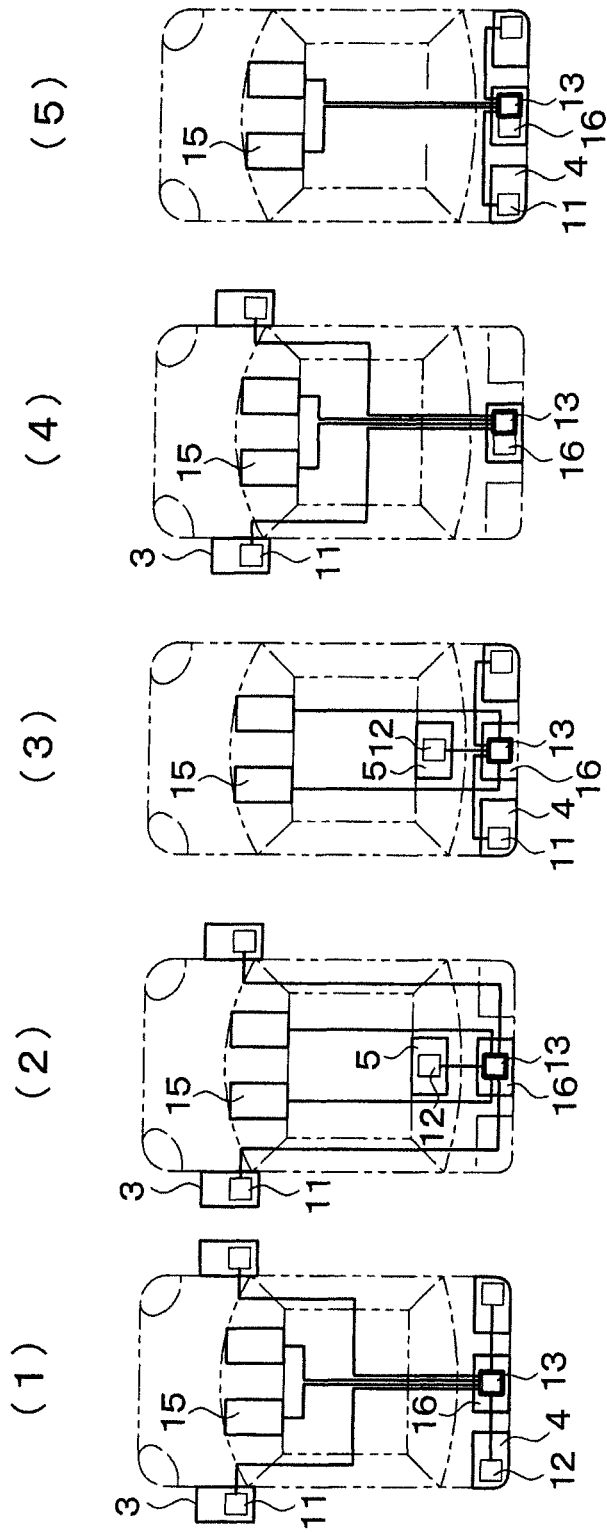
FIG. 21 is a block diagram showing third exemplary arrangements of cameras and ECUs.
Figure 22:
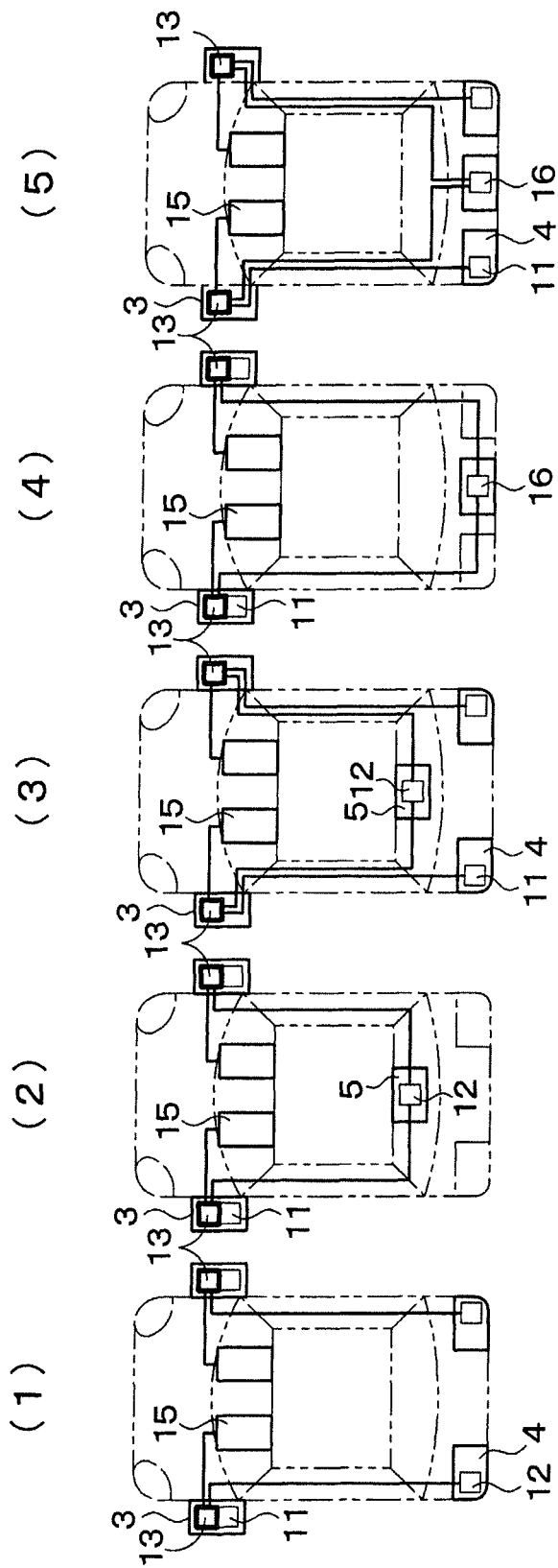
FIG. 22 is a block diagram showing fourth exemplary arrangements of cameras and ECUs.
Figure 23:
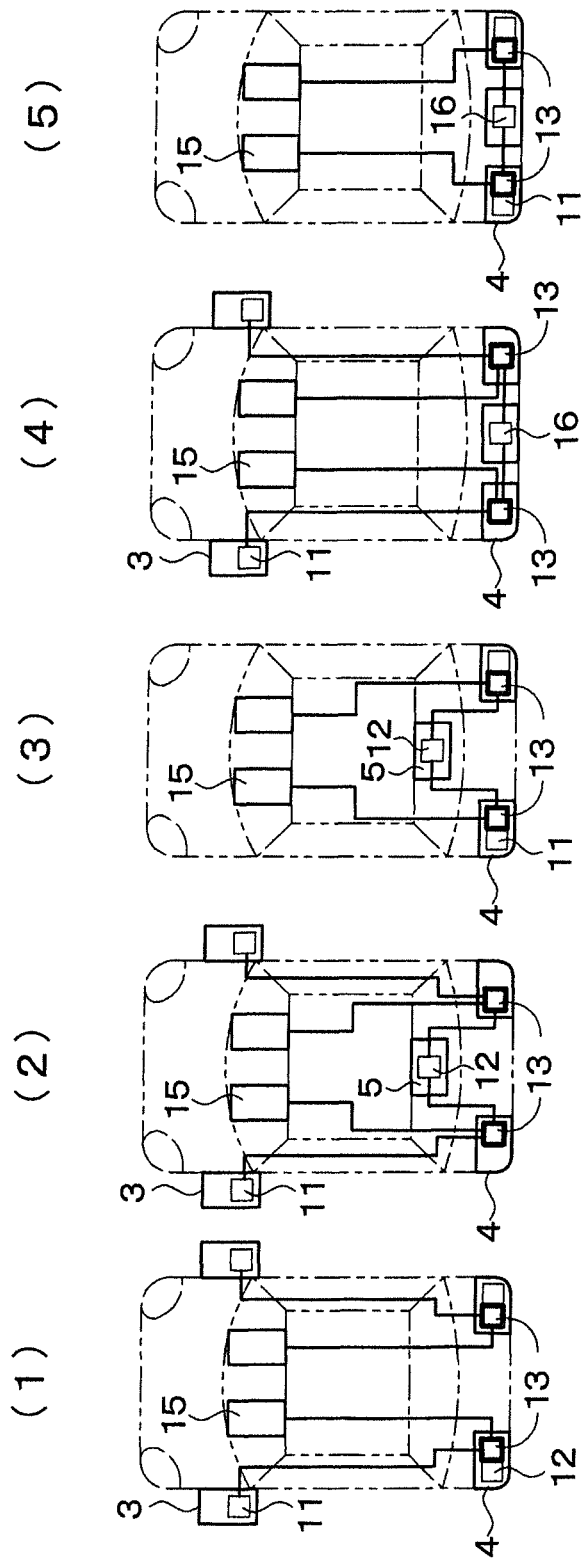
FIG. 23 is a block diagram showing fifth exemplary arrangements of cameras and ECUs.
Figure 24:
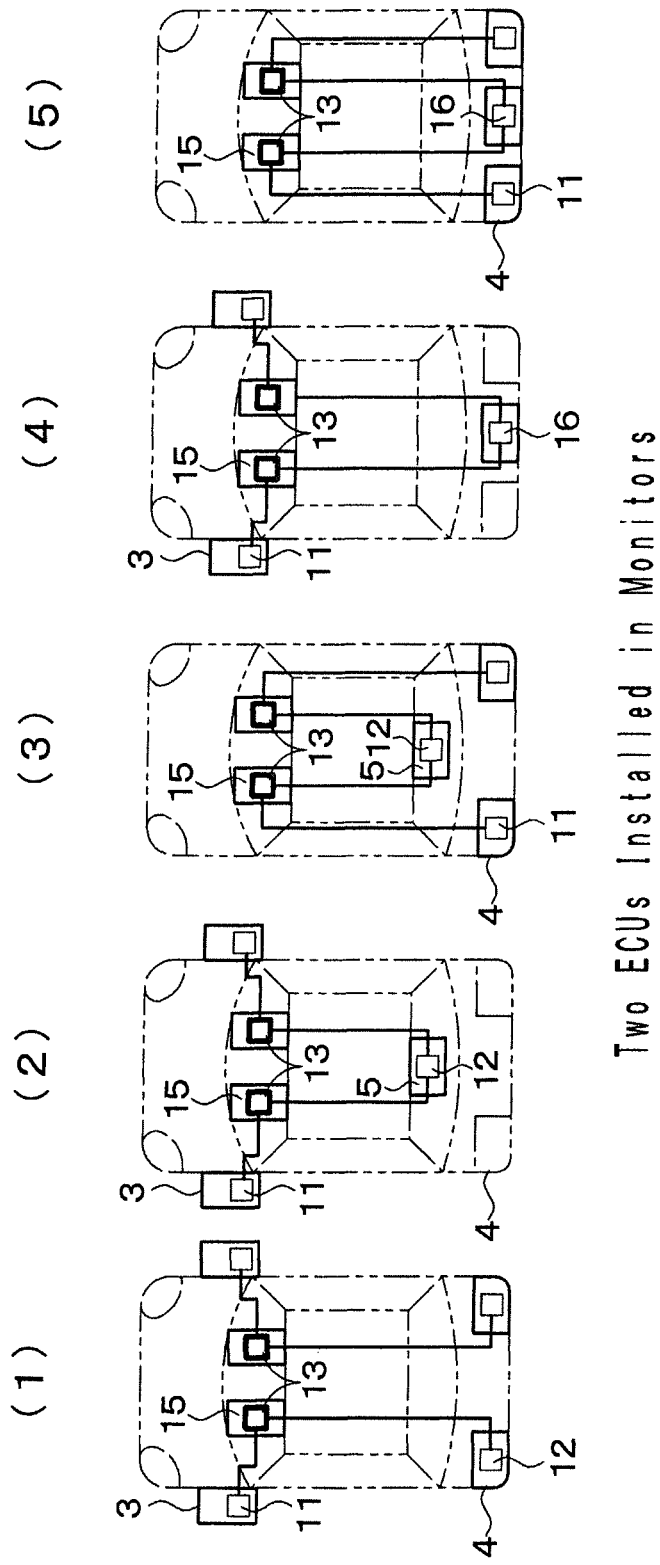
FIG. 24 is a block diagram showing sixth exemplary arrangements of cameras and ECUs.
Figure 25:
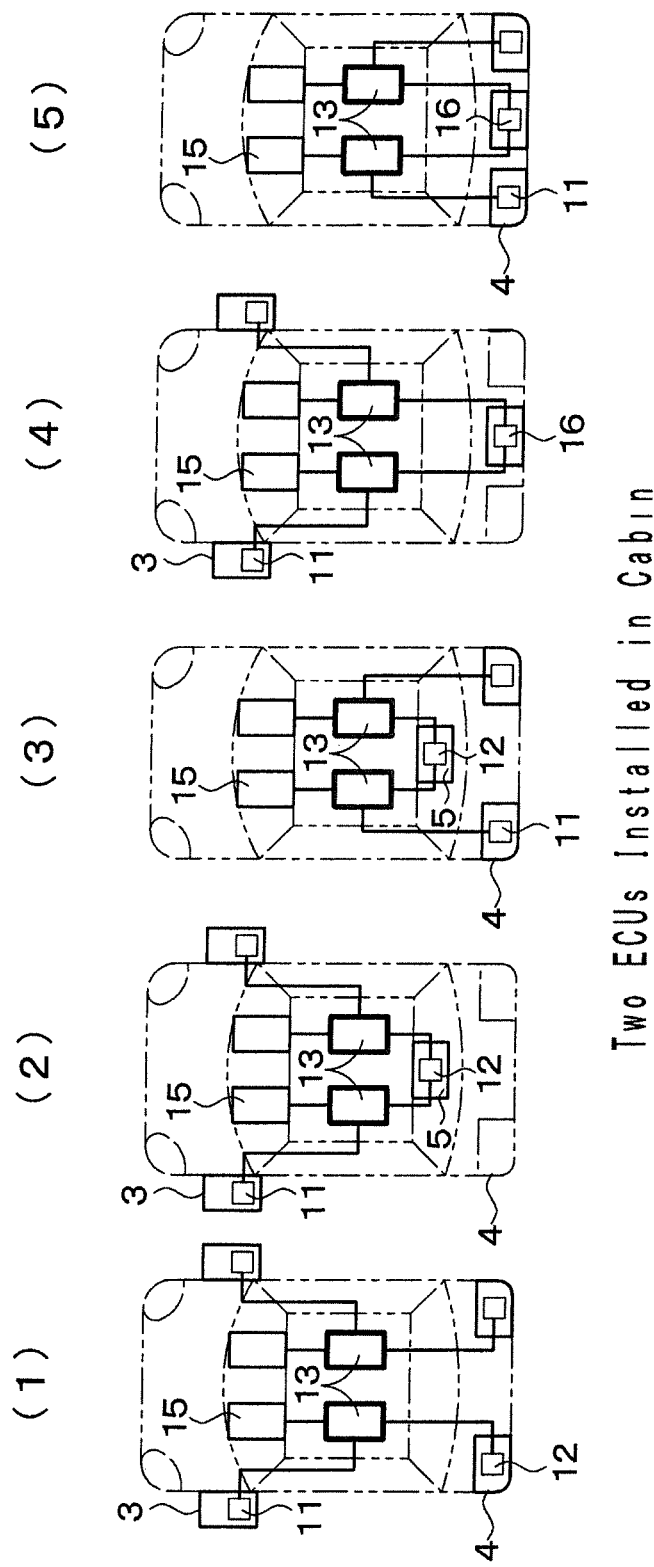
FIG. 25 is a block diagram showing seventh exemplary arrangements of cameras and ECUs.
Figure 26:
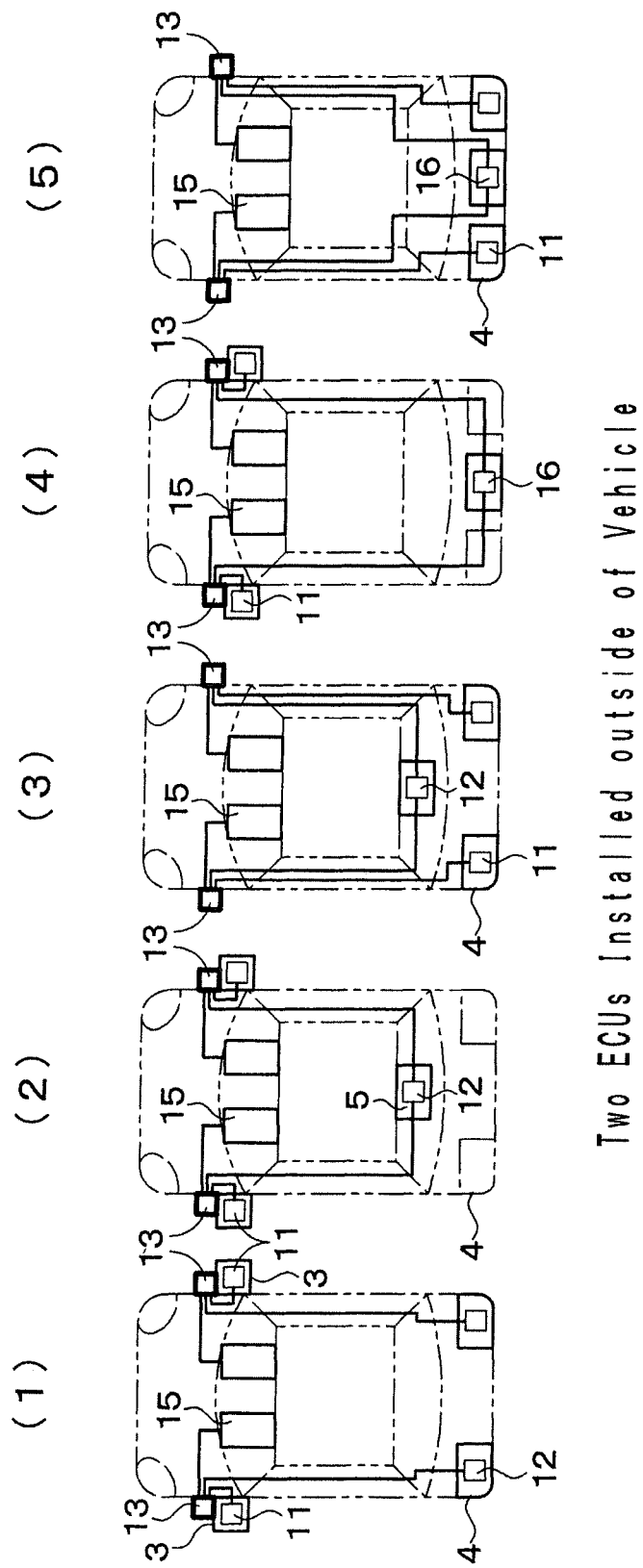
FIG. 26 is a block diagram showing eighth exemplary arrangements of cameras and ECUs.
Figure 27A:
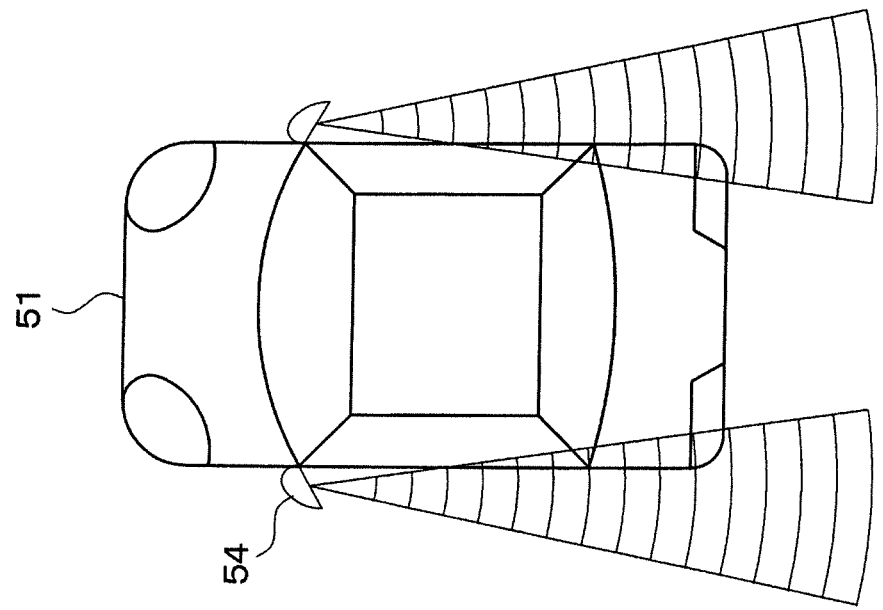
FIG. 27 is a block diagram showing a conventional camera monitoring system.
Figure 27B:
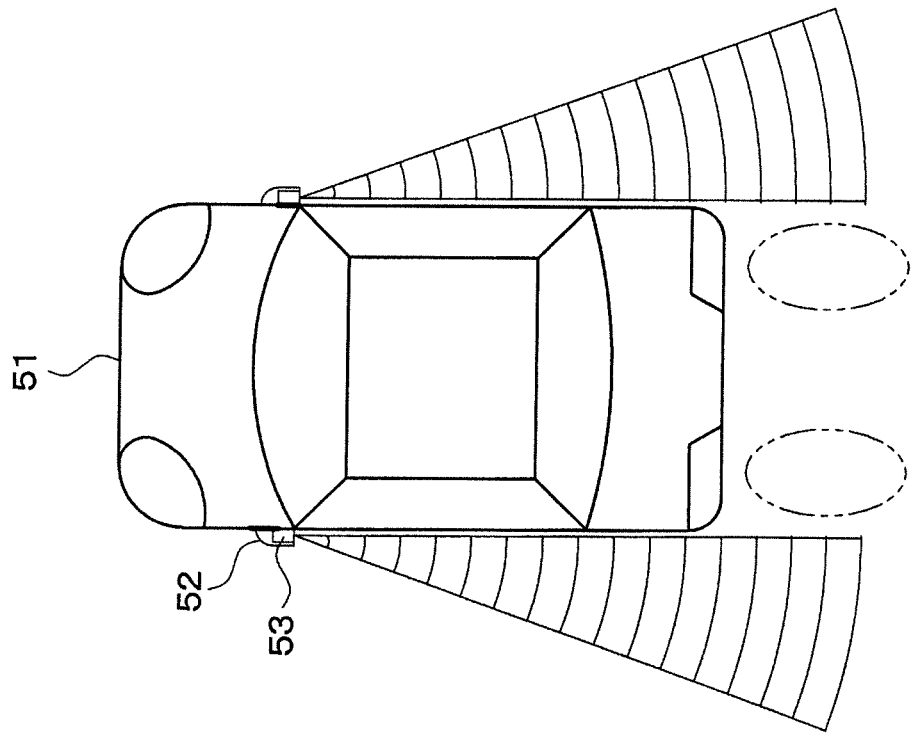

In a vehicle monitoring system 1 of an eighth embodiment shown in FIG. 18, independent CMSs 31 and 41 are provided on the right and left of a vehicle, and each of the CMSs 31 and 41 are equipped with two cameras and two ECUs. That is, the right CMS 31 is comprised of a camera A (a first camera 11) for shooting the right rear side, an ECU 13A for processing video data of the camera A, a camera B (a second camera 12) that is more inward in the width direction of the vehicle than the camera A for shooting the right rear, an ECU 13B for processing video data of the cameras A and B, and a right monitor 15 for displaying the processed video data. Similarly, the left CMS 41 is comprised of a camera C (a first camera 11), an ECU 13C, a camera D (a second camera 12), an ECU 13D, and a left monitor 15.

The camera A and the ECU 13A are contained in the right STSL 3, and the camera B and the ECU 13B are contained in the right RCL 4. The camera C and the ECU 13C are contained in the left STSL 3, and the camera D and the ECU 13D are contained in the left RCL 4. As such, the cameras A-D perform shooting, whereupon the respective ECUs 13A-D easily perform initial processing on the video data, the ECUs 13A and 13C transmit the initially processed video data to the ECU 13B and 13D, the ECU 13B performs secondary processing on the initially processed data of the cameras A and B and then combines the data while, at the same time, the ECU 13D performing secondary processing on the initially processed data of the cameras C and D and then combines the data; and subsequently, the ECU 13B and 13D transmits the corrected and combined video data to the monitors 15. This effectively allows for performing complicated data processing more quickly compared to the seventh embodiment, such as correcting the video data in the overlapping sections in the secondary processing, so as to shorten the time delay from shooting to monitor display.

FIGS. 19-26 show exemplary arrangements of cameras and ECUs. In each figure, (1)-(5) show the same arrangements of cameras as in the first to fifth embodiments, respectively. In the first exemplary arrangements shown in FIG. 19, one ECU 13 is installed in the cabin. In the second exemplary arrangements shown in FIG. 20, one ECU 13 is installed in an HMSL 5. In the third exemplary arrangements shown in FIG. 21, one ECU 13 is installed in a back camera 16. In the fourth exemplary arrangements shown in FIG. 22, right and left ECUs 13 are installed in STSLs 3. In the fifth exemplary arrangements shown in FIG. 23, right and left ECUs 13 are installed in RCLs 4. In the sixth exemplary arrangements shown in FIG. 24, right and left ECUs 13 are installed in monitors 15. In the seventh exemplary arrangements shown in FIG. 25, right and left ECUs 13 are installed in the cabin. In the eighth exemplary arrangements shown in FIG. 26, right and left ECUs 13 are installed adjacent to STSLs 3 outside of the vehicle.

It should be noted that the present invention is not limited to the foregoing embodiments and can still be carried out with the arrangements of various parts altered freely, in a scope without deviating from the spirit of the present invention as illustrated below:

(1) Providing a camera cleaning apparatus that has a cleaner nozzle, such as the cleaner nozzle 9 shown in FIG. 6, in STSLs and RCLs.

Figure 11:
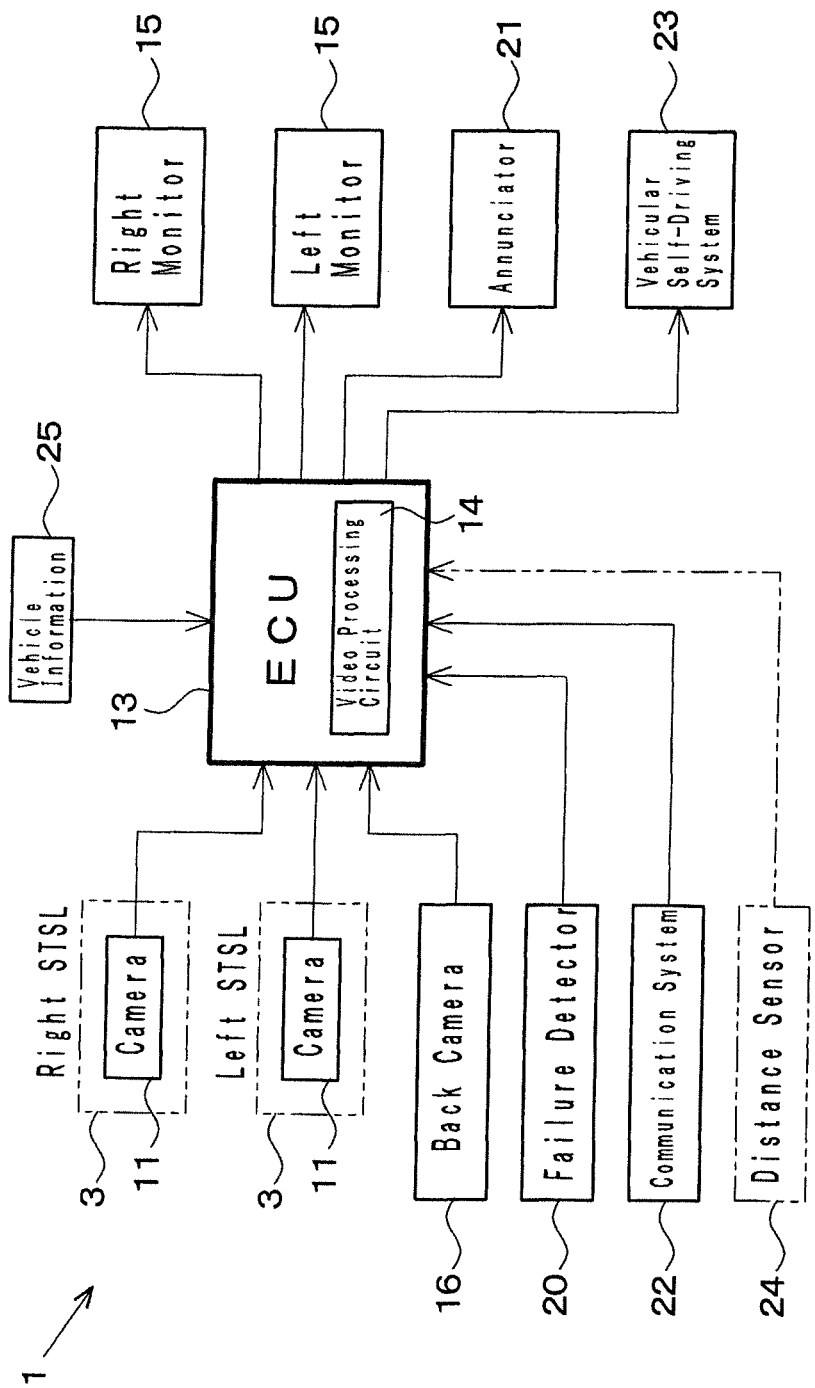
FIG. 11 is a block diagram showing a sixth embodiment of a vehicle monitoring system according to the present invention.
Figure 12:
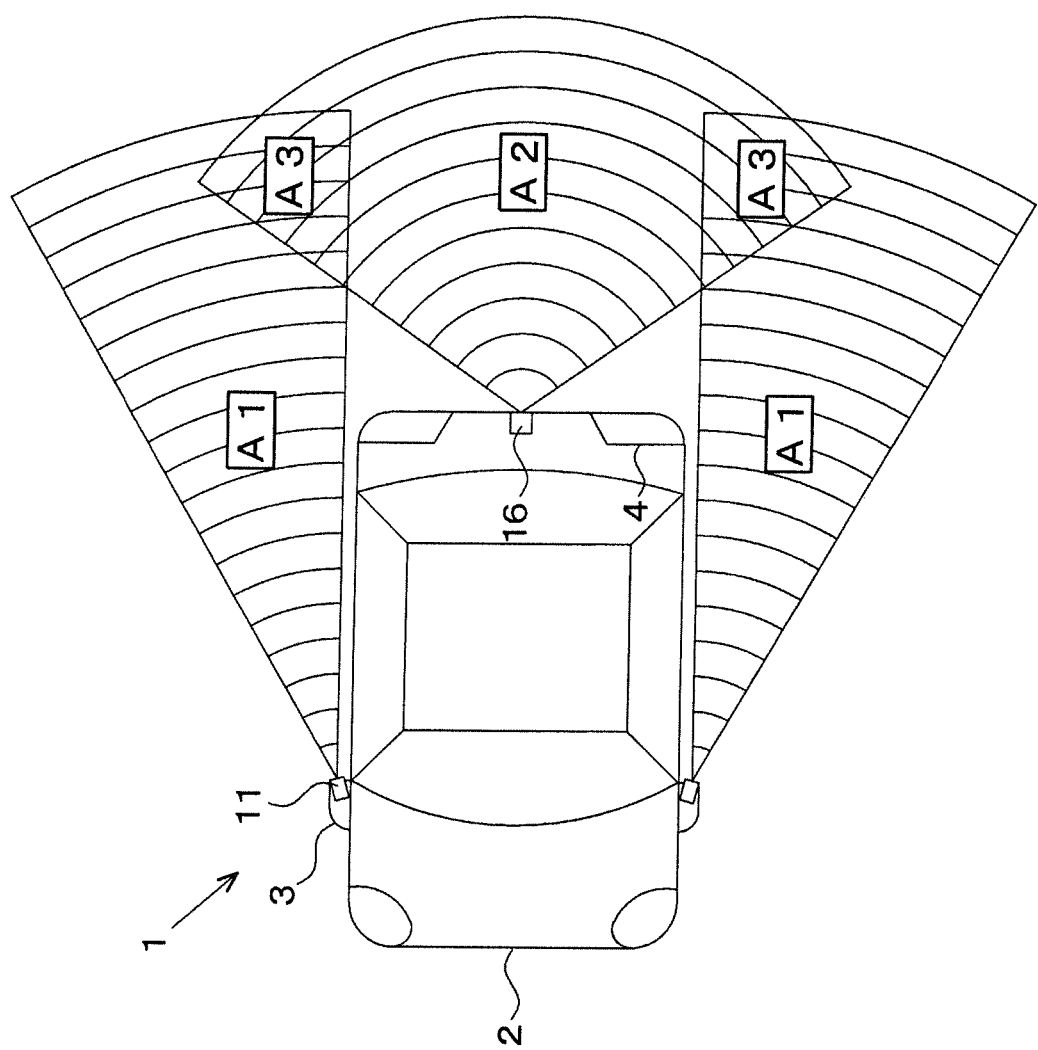
FIG. 12 is a plan view of a vehicle that shows the fields of view of the cameras in the sixth embodiment.

(2) Configuring, in the vehicle monitoring system 1 shown in FIG. 11, to cause the ECU 13 to provide scene information shot by the first cameras 11 and the second camera (for example, the back camera 16) to the vehicular self-driving system 23.

(3) Installing second cameras not only in RCLs 4 (see FIG. 1) and an HMSL 5 (see FIG. 5) but also in rear lamps disposed at the rear of the vehicle body, such as in license plate lamps and rear fog lamps (not shown).

(4) First and second cameras may also be installed in the housings of various lamps or the outside of the housings. In the latter case, waterproof camera cases that contain the cameras may be integrally provided on the outside of the lamp housings.

(5) Coordinating the installation heights (the height from the road surface to the optical axes) and/or the vertical angles of a first camera and a second camera, or providing the two cameras in locations where their heights and angles are as equal as possible to each other, in order to facilitate combining videos. For example, as the STSLs, the RCLs, the license plate lamps, and the rear fog lamps are mounted generally at similar heights on the vehicle body, it is possible to install the first camera in one of these and install the second camera in another one. In this way, the installation heights and/or the optical axial angles of both cameras can easily be coordinated.

LIST OF REFERENCE NUMERALS

1 Vehicle monitoring system
3 Side turn signal lamp (STSL)
4 Rear combination lamp (RCL)
5 High mount stop lamp (HMSL)
9 Cleaner nozzle
11 First camera
12 Second camera
13 ECU
14 Video processing circuit
15 Monitor
16 Back camera
17 Wide-angle lens
20 Failure detector
21 Annunciator
24 Distance sensor

The invention claimed is:

1. A vehicle monitoring system comprising:
one or more first sensors for collecting scene information about a first area around a vehicle;
one or more monitor means for displaying the scene information collected by the first sensor;
a second sensor for collecting scene information about a second area around the vehicle; and
one or more electronic control units for performing video processing to provide at least part of the scene information about the second area to the monitor means when the first sensor fails;
wherein the second area includes a section overlapping the first area, and when the first sensor fails, the electronic control unit performs video processing to retrieve scene information that includes the overlapping section from the scene information collected by the second sensor and to provide that to the monitor means upon performing correction to coordinate scene information that includes the overlapping section from the second area and the overlapping section included in the first area.

2. The vehicle monitoring system according to claim 1, wherein the first sensor includes a first camera for shooting the first area at a rear side of the vehicle, and the second sensor includes a second camera for shooting the second area at a rear of the vehicle.

3. The vehicle monitoring system according to claim 1 further comprising an annunciator for informing an occupant of the vehicle of failure of the first sensor.

4. The vehicle monitoring system according to claim 1, wherein the second sensor collects the scene information that includes distances to objects present in the second area, and the electronic control unit performs video processing to cause the monitor means to display a distance image of the objects.

5. The vehicle monitoring system according to claim 1, wherein the electronic control unit provides the scene information collected by the first sensor to a vehicular self-driving system of the vehicle.

* * * * *